US011181815B1

(12) United States Patent
Wheelwright et al.

(10) Patent No.: US 11,181,815 B1
(45) Date of Patent: Nov. 23, 2021

(54) OPTICAL DEVICES INCLUDING REFLECTIVE SPATIAL LIGHT MODULATORS FOR PROJECTING AUGMENTED REALITY CONTENT

(71) Applicant: FACEBOOK TECHNOLOGIES, LLC, Menlo Park, CA (US)

(72) Inventors: Brian Wheelwright, Sammamish, WA (US); Babak Amirsolaimani, Redmond, WA (US); Ying Geng, Bellevue, WA (US); Barry David Silverstein, Kirkland, WA (US); Jacques Gollier, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/438,034

(22) Filed: Jun. 11, 2019

(51) Int. Cl.
*G03B 21/28* (2006.01)
*G02B 27/01* (2006.01)
*G02F 1/1335* (2006.01)
*G02B 6/122* (2006.01)

(52) U.S. Cl.
CPC .............. *G03B 21/28* (2013.01); *G02B 6/122* (2013.01); *G02B 27/0172* (2013.01); *G02F 1/133528* (2013.01)

(58) Field of Classification Search
CPC ... G02B 27/01–0189; G02B 2027/0105–0198; G03B 21/00–64; H04N 9/31–3197
See application file for complete search history.

(56) References Cited

U.S. PATENT DOCUMENTS

| 5,726,807 | A | 3/1998 | Nakaoka et al. |
| 5,777,794 | A | 7/1998 | Nakaoka et al. |
| 5,949,583 | A | 9/1999 | Rallison et al. |
| 6,097,543 | A | 8/2000 | Rallison et al. |
| 9,933,684 | B2 | 4/2018 | Brown et al. |
| 10,108,011 | B2 | 10/2018 | Nikkhoo |
| 10,120,194 | B2 | 11/2018 | Cobb et al. |
| 10,649,210 | B2 | 5/2020 | Cobb et al. |
| 2006/0228073 | A1 | 10/2006 | Mukawa et al. |
| 2006/0268421 | A1* | 11/2006 | Shimizu ............ G02B 27/0172 359/630 |

(Continued)

OTHER PUBLICATIONS

Wheelwright, Office Action, U.S. Appl. No. 16/436,729, dated May 22, 2020, 14 pgs.

(Continued)

*Primary Examiner* — Michelle M Iacoletti
*Assistant Examiner* — Christopher A Lamb, II
(74) *Attorney, Agent, or Firm* — Morgan, Lewis & Bockius LLP

(57) ABSTRACT

An optical device includes a waveguide, a projector, a reflective display, and an in-coupler. The waveguide has a first side and an opposing second side. The projector is configured to project illumination light toward the first side of the waveguide. The reflective display is configured to receive the illumination light and to output image light toward the second side of the waveguide. The in-coupler is configured to receive the image light output by the reflective display and redirect a portion of the image light so that the portion of the image light undergoes total internal reflection inside the waveguide.

19 Claims, 14 Drawing Sheets

(56) References Cited

U.S. PATENT DOCUMENTS

| | | |
|---|---|---|
| 2014/0140653 A1 | 5/2014 | Brown et al. |
| 2014/0140654 A1 | 5/2014 | Brown et al. |
| 2016/0041390 A1 | 2/2016 | Poon et al. |
| 2016/0077338 A1 | 3/2016 | Robbins et al. |
| 2016/0252724 A1 | 9/2016 | Nikkhoo |
| 2017/0010466 A1* | 1/2017 | Klug ............... G02B 26/103 |
| 2017/0212352 A1 | 7/2017 | Cobb et al. |
| 2017/0276940 A1* | 9/2017 | Popovich ............... G02B 27/01 |
| 2018/0067315 A1 | 3/2018 | Amitai et al. |
| 2018/0082644 A1 | 3/2018 | Bohn |
| 2018/0120559 A1* | 5/2018 | Yeoh ............... G02B 5/3083 |
| 2018/0120563 A1* | 5/2018 | Kollin ............... G03H 1/2249 |
| 2018/0136473 A1 | 5/2018 | Cobb et al. |
| 2018/0164583 A1 | 6/2018 | Wall et al. |
| 2018/0239177 A1 | 8/2018 | Oh |
| 2018/0373115 A1 | 12/2018 | Brown et al. |
| 2019/0179149 A1* | 6/2019 | Curtis ............... G02B 27/0176 |

OTHER PUBLICATIONS

Facebook Technologies, LLC, International Search Report and Written Opinion, PCT/US2020/034754, dated Sep. 16, 2020, 9 pgs.
Wheelwright, Final Office Action, U.S. Appl. No. 16/436,729, dated Oct. 21, 2020, 14 pgs.
Wheelwright, Office Action, U.S. Appl. No. 16/436,736, dated Jul. 16, 2020, 24 pgs.
Wheelwright, Notice of Allowance, U.S. Appl. No. 16/436,736, dated Nov. 17, 2020, 10 pgs.
Wheelwright, Notice of Allowance, U.S. Appl. No. 16/436,729, dated Feb. 12, 2021, 9 pgs.

* cited by examiner (I)

(II)

OPTICAL DEVICES INCLUDING REFLECTIVE SPATIAL LIGHT MODULATORS FOR PROJECTING AUGMENTED REALITY CONTENT

RELATED APPLICATIONS

This application is related to U.S. patent application Ser. No. 16/436,729, entitled "Optical Assemblies Having Polarization Volume Gratings for Projecting Augmented Reality Content" filed Jun. 10, 2019 and U.S. patent application Ser. No. 16/436,736, entitled "Optical Assemblies Having Scanning Reflectors for Projecting Augmented Reality Content" filed Jun. 10, 2019.

TECHNICAL FIELD

This relates generally to display devices, and more specifically to head-mounted display devices.

BACKGROUND

Head-mounted display devices (also called herein head-mounted displays) are gaining popularity as a means for providing visual information to a user. For example, the head-mounted display devices are used for virtual reality, augmented reality, and mixed reality operations. However, the size and weight of conventional head-mounted displays limit their applications.

Generally, head-mounted display devices with a wide field of view are desired for improved user experience. This makes it even more challenging to reduce the sizes of head-mounted display devices.

SUMMARY

Accordingly, there is a need for compact head-mounted display devices capable of rendering images with a wide field of view to enhance users' overall experience of augmented, mixed, and/or virtual reality.

The above deficiencies and other problems associated with conventional head-mounted displays are reduced or eliminated by the disclosed optical device including a reflective display (e.g., a reflective display such as a Liquid Crystal on Silicon (LCOS) display) configured to project image light and an optical assembly configured to direct the image light from the reflective display to a user's eye. The optical assembly has a compact configuration that provides a folded optical path for projecting images from the reflective display to the user's eye, thereby increasing the effective focal length for projecting images. The increased effective focal length results in a wider field of view for a head-mounted display device employing such an optical assembly.

In accordance with some embodiments, an optical device includes a first waveguide, a projector, a reflective display, and a first in-coupler. The first waveguide has a first side and an opposing second side. The projector is configured to project illumination light toward the first side of the first waveguide. The reflective display is configured to receive the illumination light and to output image light toward the second side of the first waveguide. The first in-coupler is configured to receive the image light output by the reflective display and redirect a first portion of the image light so that the first portion of the image light undergoes total internal reflection inside the first waveguide.

In accordance with some embodiments, a head-mounted display device includes a first waveguide, a projector, a reflective display, and a first polarization selective in-coupler. The first waveguide has a first side and an opposing second side. The projector is configured to project illumination light toward the first side of the first waveguide. The reflective display is configured to receive the illumination light and to output image light toward the second side of the first waveguide. The first in-coupler and one or more output couplers are positioned at a distance from the first in-coupler. The first in-coupler is configured to receive the image light output by the reflective display and redirect a first portion of the image light so that the first portion of the image light propagates toward the one or more output couplers by total internal reflection inside the first waveguide. The one or more output couplers is configured to receive and redirect the first portion of the image light out of the first waveguide.

In accordance with some embodiments, a method includes projecting illumination light toward a first side of a first waveguide and receiving the illumination light at a reflective display facing a second side of the first waveguide. In response to receiving the illumination light, the method includes outputting image light from the reflective display toward a second side of the first waveguide. The method also includes receiving, by a first in-coupler, the image light output by the reflective display and redirecting, by the first in-coupler, at least a first portion of the image light so that the at least first portion of the image light undergoes total internal reflection inside the first waveguide.

Thus, the disclosed embodiments provide a display device capable of switching between an opaque mode and a see-through mode to selectively allow external or ambient light to enter the eyes of a user.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1:
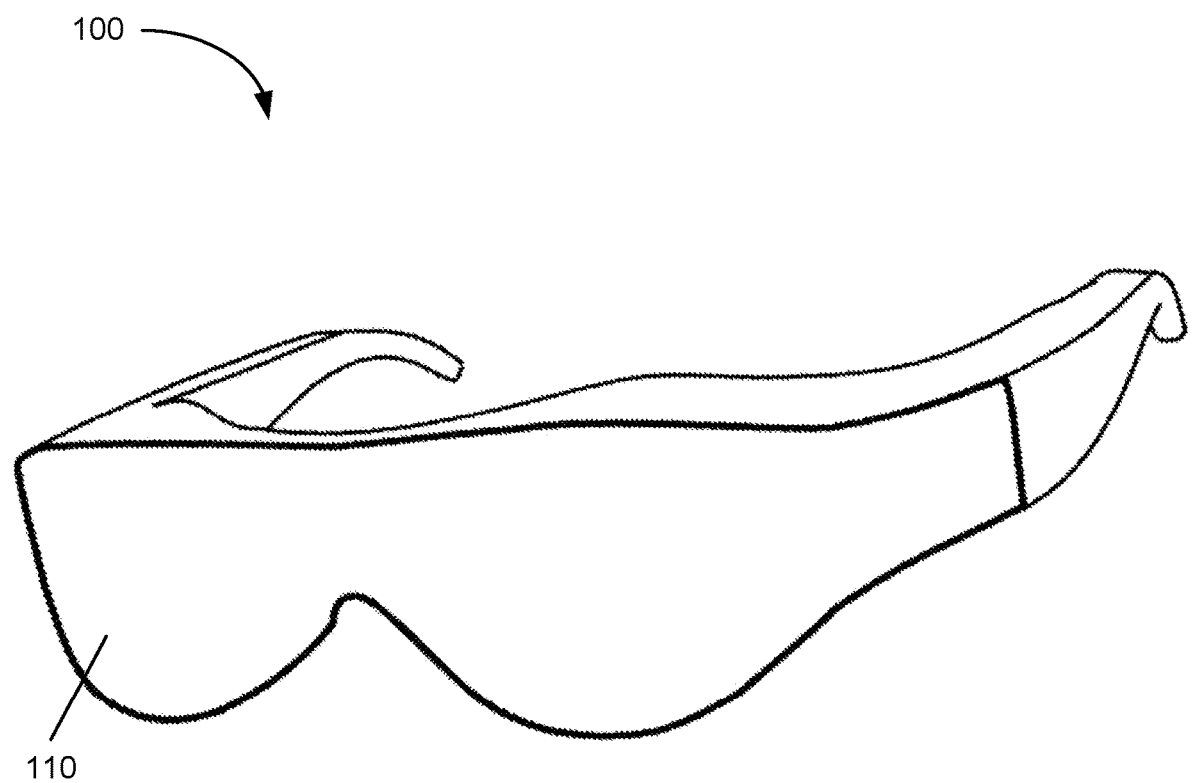
FIG. 1 is a perspective view of a display device in accordance with some embodiments.

These figures are not drawn to scale unless indicated otherwise.

DETAILED DESCRIPTION

The present disclosure provides a head-mounted display device (or a display device) including an optical device for projecting augmented reality content to an eye of a user. The optical device includes a projector, a reflective display and an optical assembly including one or more polarization volume gratings. Each polarization volume grating is coupled with a (optical) waveguide. In some embodiments, the reflective display is a spatial light modulator (e.g., a Liquid Crystal on Silicon (LCOS) display). The optical assembly is configured to receive image light from the reflective display. The one or more waveguides of the optical assembly are configured to output at least a portion of the image light toward the eye of the user. The one or more waveguides are also configured to transmit light from outside the display device, thereby combining the images output by the reflective display with a real-world view.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first waveguide could be termed a second waveguide, and, similarly, a second waveguide could be termed a first waveguide, without departing from the scope of the various described embodiments. The first waveguide and the second waveguide are both waveguide, but they are not the same waveguide.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates a perspective view of display device 100 in accordance with some embodiments. In some embodiments, display device 100 is configured to be worn on the head of a user (e.g., by having the form of spectacles, goggles, or eyeglasses, as shown in FIG. 1, or to be included as part of a helmet or a hat that is to be worn by the user). When display device 100 is configured to be worn on the head of a user, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed-reality contents, or any combination thereof) to a user. In some embodiments, display 110 is a clip-on display. A clip-on display is configured to be coupled (e.g., clipped on) to a frame of a headset (e.g., a frame of goggles) for displaying visual content. The clip-on display is further configured to be un-coupled from the frame of the headset.

Figure 2:
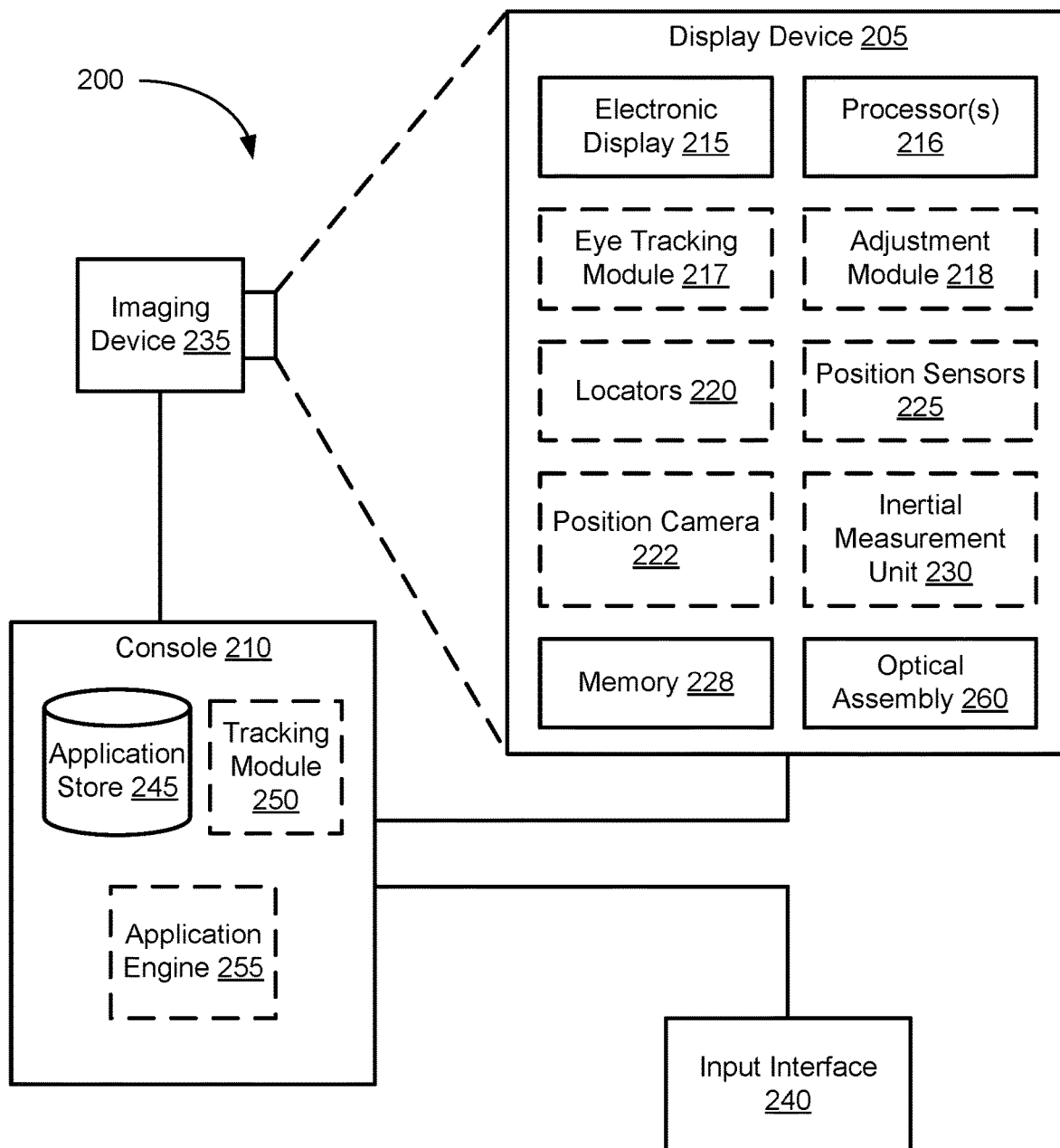
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed-reality by adding in a view of the real surroundings. Thus, display device 205 and system 200 described here can deliver augmented reality, virtual reality, and/or mixed-reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or as some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM, or other random access solid state memory device; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of light emission devices include: an organic light emitting diode, an active-matrix organic light-emitting diode, a light emitting diode, some type of device capable of being placed in a flexible display, or some combination thereof. Light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox. An eyebox is a region that is occupied by an eye of a user of display device 205 (e.g., a user wearing display device 205) who is viewing images from display device 205. In some embodiments, the eyebox is represented as a 10 mm×10 mm square. In some embodiments, the one or more optical components include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is also used to determine the location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., a user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, it sends a discrete image to the display, which will tile sub-images together thus allowing a coherent stitched image to appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to the motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; in practice, however, the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so that it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field-of-view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260, which can include a single optical assembly 260 or multiple optical assemblies 260 (e.g., an optical assembly 260 for each eye of a user). In some embodiments, the one or more optical assemblies 260 receive image light for the computer generated images from the electronic display 215 and direct the image light toward an eye or eyes of a user. The computer-generated images include still images, animated images, and/or a combination thereof. The computer-generated images include objects that appear to be two-dimensional and/or three-dimensional objects.

In some embodiments, electronic display 215 projects computer-generated images to one or more reflective elements (not shown), and the one or more optical assemblies 260 receive the image light from the one or more reflective elements and direct the image light to the eye(s) of the user. In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions that when executed by a processor is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
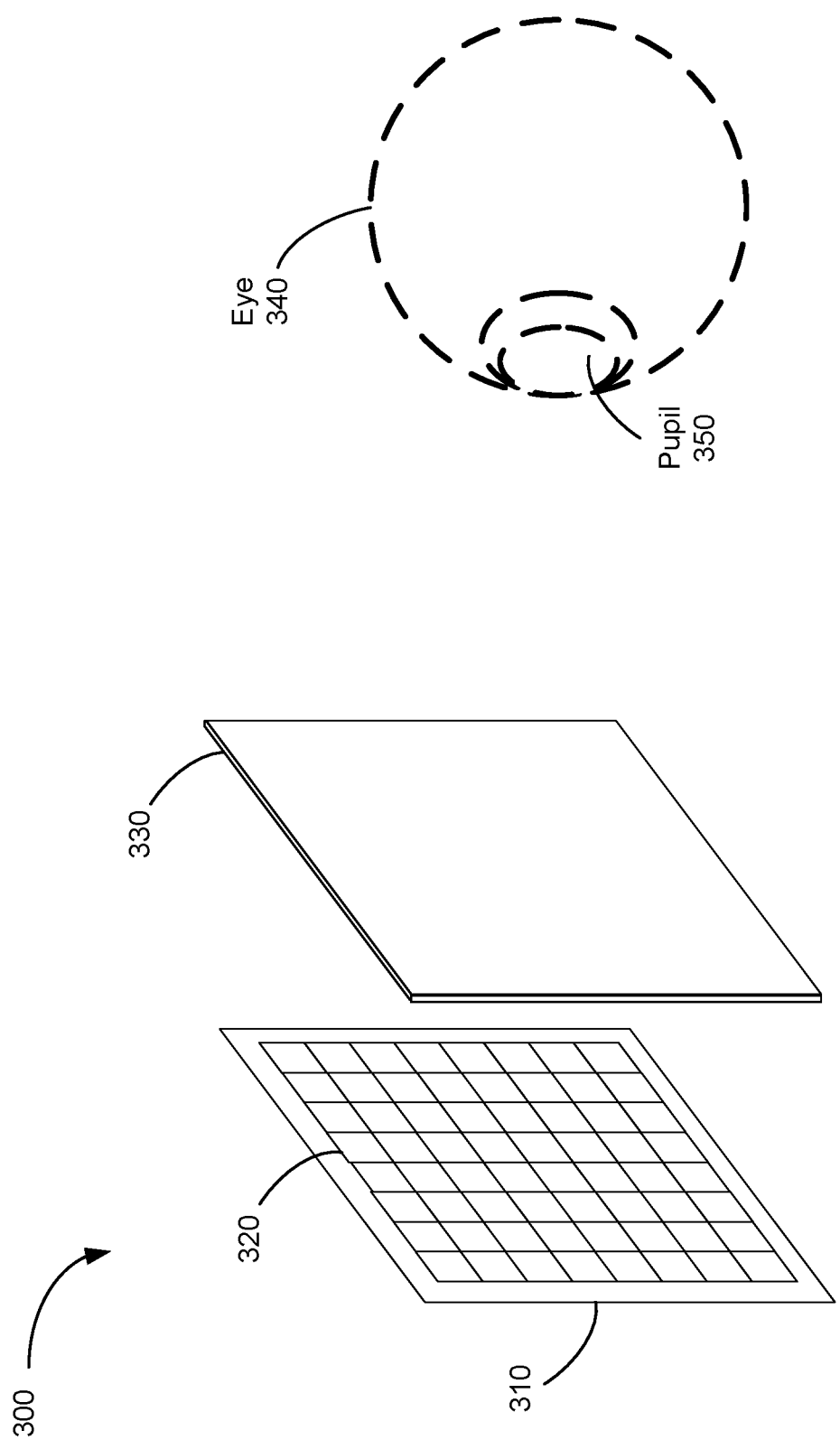
FIG. 3 is an isometric view of a display device in accordance with some embodiments.

FIG. 3 is an isometric view of a display device 300, which corresponds to part of or all of display device 100 (see FIG. 1) in accordance with some embodiments. In some embodiments, display device 300 includes an emission surface 310 (e.g., a light emission device array), and an optical assembly (e.g., optical assembly 260) having one or more optical components 330 (e.g., one or more of lenses, reflectors, waveguides, and/or polarization volume gratings described below with respect to FIGS. 4A-7D).

In some embodiments, light emission device array 310 emits image light toward the optical components 330. Light emission device array 310 may be, e.g., an array of LEDs, an array of microLEDs, an array of OLEDs, or some combination thereof. Light emission device array 310 includes light emission devices 320 that emit light in the visible light range.

In some embodiments, display device 300 includes an emission intensity array configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light emission device array 310 is passed to the one or more optical components 330. In some embodiments, display device 300 uses an emission intensity array to facilitate providing image light to a location of pupil 350 of eye 340 of a user, and to minimize the amount of image light provided to other areas in the eyebox.

In some embodiments, light emission device array 310 and an emission intensity array make up a display element. Alternatively, the display element includes light emission device array 310 (e.g., when light emission device array 310 includes individually adjustable pixels) without the emission intensity array. In some embodiments, the emission intensity array is a reflective emission intensity array (e.g., a reflective display) and is separate from light emission device array 310.

In some embodiments, display device 300 includes one or more broadband sources of light (e.g., one or more white LEDs) coupled with a plurality of color filters, in addition to, or instead of, light emission device array 310.

One or more optical components 330 receive the image light (or modified image light, e.g., attenuated light) from emission surface 310, and direct the image light to a detected or presumed location of the pupil 350 of an eye 340 of a user. In some embodiments, the one or more optical components include one or more optical assemblies 260.

Figure 4A:
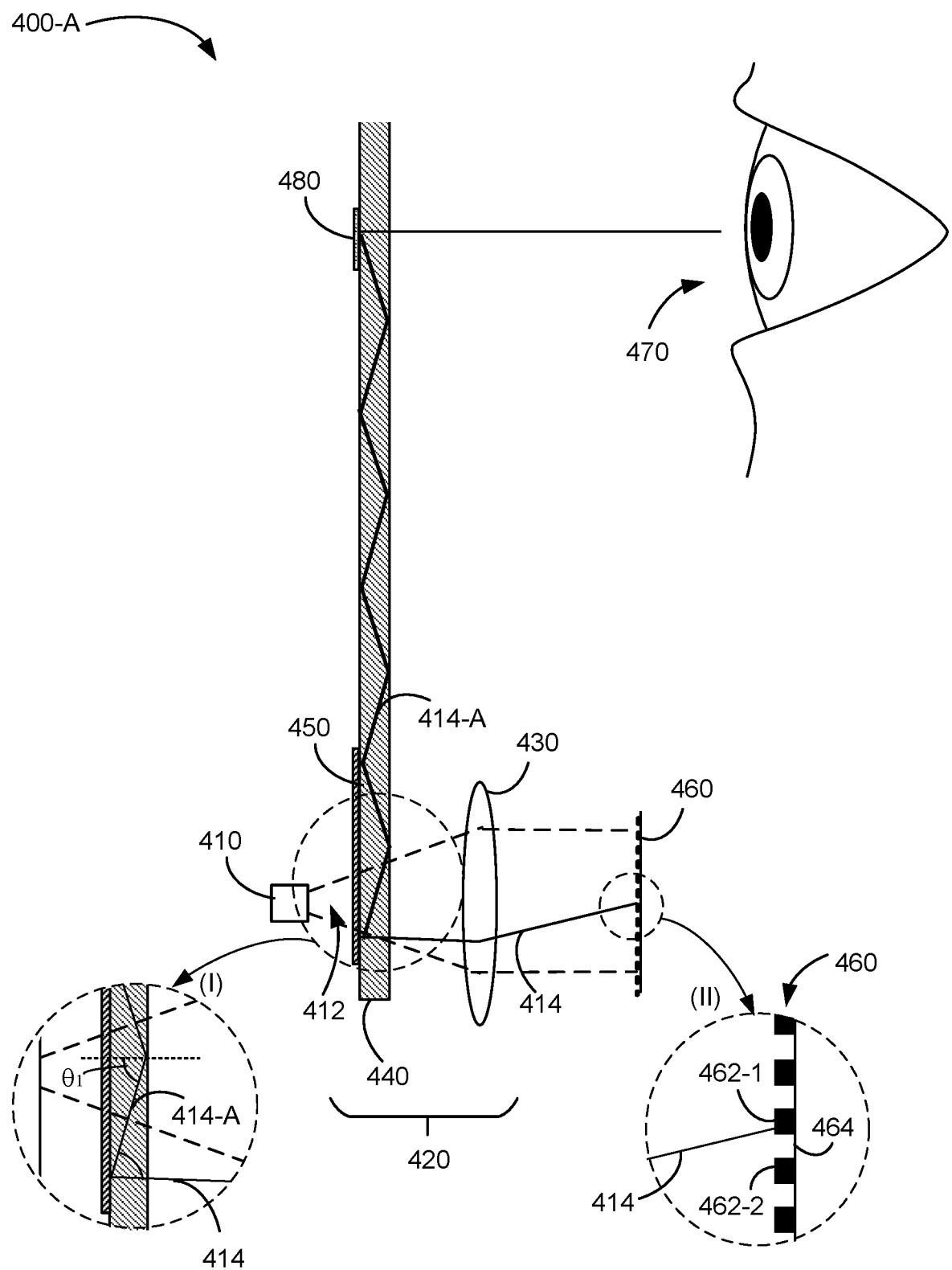
FIG. 4A is a schematic diagram illustrating a display device in accordance with some embodiments.

FIG. 4A is a schematic diagram illustrating display device 400-A in accordance with some embodiments. Display device 400-A includes projector 410 configured to project illumination light 412 and reflective display 460 configured to receive illumination light 412 and output image light 414. Display device 400-A also includes optical assembly 420 configured to project image light 414 from reflective display 460 toward eye 470 of a user.

In some embodiments, optical assembly 420 corresponds to optical assembly 260 described with respect to FIG. 2. As shown in FIG. 4A, optical assembly 420 includes first waveguide 440 and first in-coupler 450 coupled with first waveguide 440.

First in-coupler 450 includes a polarization selective element selective either on linearly polarized light or circularly polarized light. For example, a polarization selective element transmits light having a first polarization (e.g., a first circular polarization or a first linear polarization) and redirects light having a second polarization distinct from the first polarization (e.g., a second circular polarization opposite to the first circular polarization or a second linear polarization orthogonal to the first linear polarization). First in-coupler 450 is a liquid crystal based polarization selective element, a polarization selective element including a metasurface, a polarization selective element including a resonant structured surface, a polarization selective element including a continuous chiral layer, or a polarization selective element including a birefringent material. For example, a polarization selective element including a continuous chiral layer can be selective on circularly polarized light. As another example, a polarization selective element including a metasurface or resonant structures can be selective either on linearly polarized light or circularly polarized light. In some embodiments, first in-coupler 450 is a polarization volume grating (PVG) (e.g., polarization volume grating 700 described below with respect to FIGS. 7A-7D). A PVG (e.g., PVG 700) is selective with respect to polarization, incident angle and/or wavelength range of light incident thereon. For example, PVG 700 may transmit light having a first circular polarization and diffract light having a circular polarization that is orthogonal to the first circular polarization (e.g., a second circular polarization).

In FIG. 4A, display device 400-A includes in-coupler 450 which is selective on circular polarization (e.g., in-coupler 450 is PVG 700 described with respect to FIGS. 7A-7D). Distinctions between propagation of linearly polarized light and circularly polarized light in display device 400-A are discussed below with respect to Diagrams (I) and (II) of FIG. 4C.

In some embodiments, projector 410 corresponds to light emission device array 310 (e.g., includes one or more broadband sources) described above with respect to FIG. 3. Projector 410 is configured to project illumination light 412 to illumination reflective display 460. In some embodiments, illumination light is broadband light (e.g., white light).

In some embodiments, reflective display 460 includes reflective surface 464 and pixels (e.g., pixels 462-1 and 462-2 shown in inset (II) of FIG. 4A). Pixels 462-1 and 462-2 include respective modulating elements. In some embodiments, the modulating elements include liquid crystals. The respective modulating elements are configured to modulate an amount of illumination light 412 that reaches reflective surface 464 so that image light 414 corresponds to one or more images to be displayed by optical device 400-A.

In some embodiments, reflective display 460 is a spatial light modulator (SLM). In some embodiments, reflective display 460 is a Liquid Crystal on Silicon (LCOS) display. LCOS displays include an array of liquid crystal pixels (e.g., pixels 462-1 and 462-2) on a silicon chip having a highly reflective coating (e.g., reflective surface 464). The liquid crystals are configured to modulate amplitude, polarization and/or phase of light. LCOS displays provide a reduced screen door effect (e.g., visibility of gaps between pixels) compared to transmissive liquid crystal displays because circuitry required for pixels is disposed behind the pixels, rather than around the pixels. Additionally, LCOS displays have high brightness and high efficiency, and are suitable for small sized displays (e.g., microdisplays). In some embodiments, reflective display 460 is a ferroelectric liquid crystal on silicon (FLCOS) display, or a micro-electro mechanical system (MEMS) spatial light modulator.

In some embodiments, reflective display 460 is configured to output image light 414 by modulating polarization of received illumination light 412 on a per-pixel basis (e.g., pixels 462-1 and 462-2 modulate polarization of illumination light 412 individually to form image content). Image light 414 output by reflective display 460 thereby includes different polarizations (e.g., a combination of left-handed and right-handed circular polarizations). In such embodiments, first in-coupler 450 is further configured to function as a selective analyzer that allows only image light with a particular polarization to be in-coupled to the first waveguide 440 (e.g., first portion 414-A of image light 414) while transmitting image light with other polarizations.

First waveguide has first side 440-A and second side 440-B. Projector 410 is configured to project illumination light 412 toward first side 440-A of first waveguide 440. As shown in FIG. 4A, projector 410 is configured to project illumination light 412 such that illumination light 412 is transmitted through first waveguide 440 and first in-coupler 450 while propagating from projector 410 to reflective display 460. Illumination light 412 has the first circular polarization. First in-coupler 450 is configured to transmit illumination light 412 projected by projector 410 toward reflective display 460 without changing its polarization or direction. Reflective display 460 is configured to receive illumination light 412 and to output image light 414 (e.g., modulated light) toward second side 440-B of first waveguide 440. First in-coupler 450 is configured to receive image light 414 output by reflective display 460 and to diffract or redirect at least a portion of image light 414, i.e., first portion 414-A of image light 414. Due to the redirection by first in-coupler 450, first portion 414-A of image light 414 impinges on a surface of first waveguide 440 at an incident angle $\theta_1$ that is above a critical angle associated with first waveguide 440, as shown in inset (I) of FIG. 4A. The critical angle refers to an angle of incidence above which light passing through a denser medium (e.g., waveguide 440) to a surface of a less dense medium (e.g., air outside waveguide 440) is totally reflected (i.e., the critical angle is an angle of incidence above which total internal reflection occurs). First portion 414-A of image light 414 thereby undergoes total internal reflection inside first waveguide 440 and propagates through the waveguide via repeated occurrences of total internal reflection, as shown by the zig-zagging light path of first portion 414-A of image light 414 in FIG. 4A.

In some embodiment, optical assembly 420 further includes one or more lenses 430. One or more lenses 430 are disposed between first in-coupler 450 and reflective display 460 and are configured to focus image light 414 from reflective display 460. In some embodiments, one or more lenses 430 focus image light 414 such that image light 414 transmitted by one or more lenses 430 is more collimated than image light 414 incident on one or more lenses 430. In some embodiments, one or more lenses 430 collimate image light 414.

As show in in FIG. 4A, display device 400-A further includes one or more output couplers 480 coupled with first waveguide 440. One or more output couplers 480 are positioned at a distance from first in-coupler 450. One or more output couplers 480 are configured to redirect at least a portion of the first portion 414-A of image light 414 out of first waveguide 440 toward eye 470 of the user. In some embodiments, one or more output couplers 480 include one or more surface relief gratings. In some embodiments, one or more output couplers 480 include one or more reflectors, one or more partial reflectors, one or more gratings, one or more tunable liquid crystal components, and/or one or more polarization volume gratings. In some embodiments, one or more output couplers 480 are configured to redirect the first portion 414-A of image light 414 to eye 470 while also expanding etendue of light 412 in optical assembly 420. Etendue refers to a property of light in an optical system characterizing how "spread out" the light is with respect to beam area and angle. An original input pupil area of light 412 is increased by replication due to multiple interactions with one or more output couplers 480.

Figure 4B:
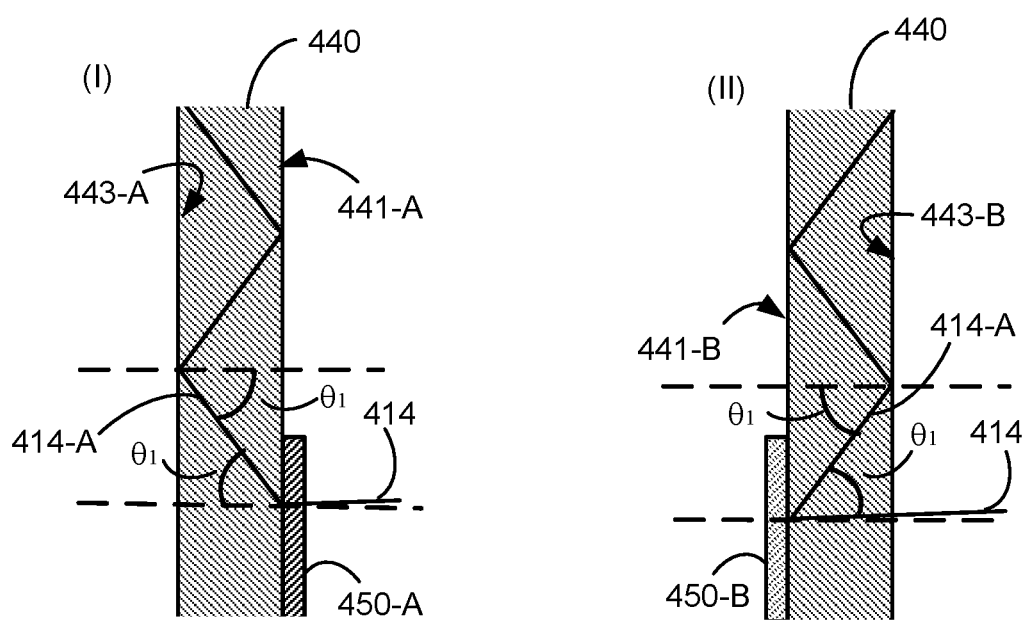
FIG. 4B includes schematic diagrams illustrating a transmission polarization volume grating (Diagram (I)) and a reflective polarization volume grating (Diagram (II)) in accordance with some embodiments.

First in-coupler 450 can be a transmission polarization volume grating or a reflective polarization volume grating. FIG. 4B includes schematic diagrams illustrating transmission PVG 450-A coupled with first waveguide 440 (Diagram (I)) and reflective PVG 450-B coupled with first waveguide 440 (Diagram (II)), in accordance with some embodiments. Either transmission PVG 450-A or reflective PVG 450-B can be used as first in-coupler 450 of display device 400-A. Transmission PVG 450-A and reflective PVG 450-B are each configured to transmit light having the first circular polarization without changing its direction or polarization. Transmission PVG 450-A is further configured to transmit and redirect light having the second circular polarization. Reflective PVG 450-B is further configured to reflect and redirect the light having the second circular polarization. Diagram (I) of FIG. 4B shows transmission PVG 450-A being employed as first in-coupler 450 in optical assembly 420 and disposed on external surface 441-A of first waveguide 440, so that image light 414 impinges on first in-coupler 450 before propagating through any portion of first waveguide 440. Transmission PVG 450-A is configured to redirect the first portion 414-A of image light 414 such that the first portion 414-A of image light 414 enters first waveguide 440 at the incident angle $\theta_1$ that is greater than the critical angle associated with first waveguide 440. The first portion 414-A of image light 414 thereby undergoes total internal reflection as is impinges on opposite internal surface 443-A of first waveguide 440. Diagram (II) of FIG. 4B shows reflective PVG 450-B disposed on external surface 441-B of first waveguide 440 so that image light 414 propagates through first waveguide 440 prior to impinging on reflective polarization volume grating 450-B. Reflective PVG 450-B is configured to deflect the first portion 414-A of image light 414 toward opposing internal surface 443-B of first waveguide 440 such that first portion 414-A of image light 414 impinges on opposing internal surface 443-B at the incident angle $\theta_1$ that is greater than the critical angle associated with first waveguide 440. First portion 414-A of image light 414 thereby undergoes total internal reflection and continues to propagate along first waveguide 440.

In some embodiments, transmission PVG 450-A or reflective PVG 450-B is a thin film coated on an external surface of first waveguide 440. In some embodiments, transmission PVG 450-A or reflective PVG 450-B can be at least partially embedded in first waveguide 440.

Figure 4C:
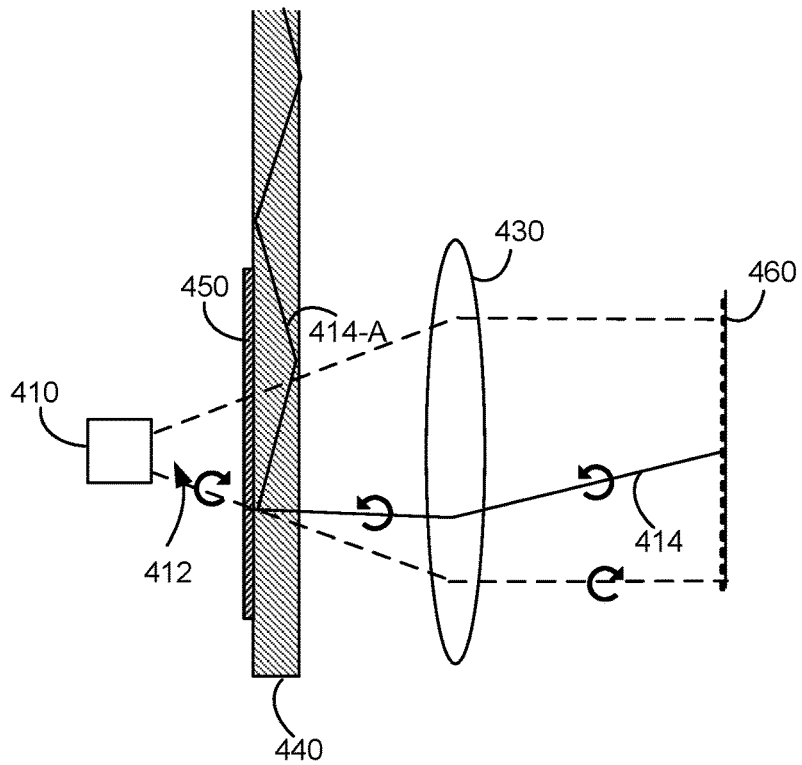
FIG. 4C includes schematic diagrams illustrating propagation of circularly polarized light (Diagram (I)) and linearly polarized light (Diagram (II)) through an optical assembly in accordance with some embodiments.
Figure 4C:
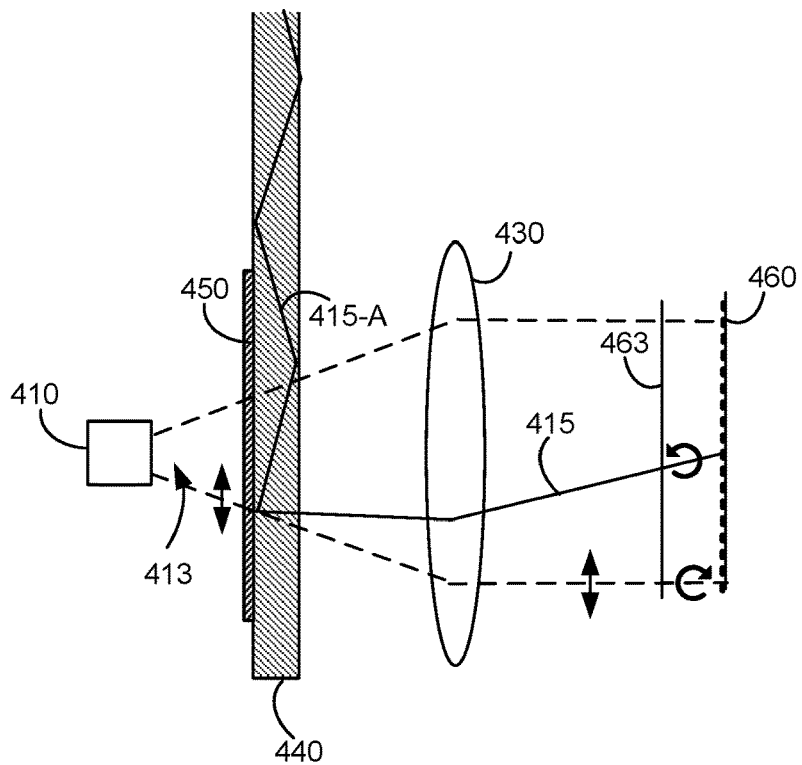

FIG. 4C includes schematic diagrams illustrating propagation of circularly polarized light (Diagram (I)) and linearly polarized light (Diagram (II)) through an optical assembly in accordance with some embodiments. In Diagram (I), projector 410 is configured to project illumination light 412 having the first circular polarization. In-coupler 450, waveguide 440, and optional one or more lenses 430 are configured to transmit illumination 412 without changing its polarization. Reflective display 460 is configured to receive image light 412 having the first circular polarization and output image light 414 having the second circular polarization. In-coupler 450 is configured to receive image light 414 having the second circular polarization, transmitted through one or more lenses 430 and waveguide 440, and deflect at least a portion of image light 414, i.e., a first portion 414-A of image light 414, such that first portion 414-A of image light 414 impinges on a surface of first waveguide 440 at an incident angle $\theta_1$ that is above a critical angle associated with first waveguide 440. In Diagram (II), projector 410 is configured to project illumination light 413. Illumination light 413 corresponds to illumination light 412 in Diagram (I) except that illumination light 413 has a first linear polarization. In-coupler 450, waveguide 440, and optional one or more lenses 430 are configured to transmit illumination 412 without changing its polarization. In Diagram (II), display device 400-A includes retarder plate 463 (e.g., a quarter-wave plate) disposed between one or more lenses 430 and reflective display 460. Retarder plate 463 is configured to receive illumination light 413 having the first linear polarization and to transmit illumination to reflective display while converting the polarization of illumination light 413 to the first circular polarization. Reflective display 460 is configured to receive illumination light 413 having the first circular polarization and output image light 415 having the second circular polarization. Image light 415 corresponds to image light 414, except that image light 415 is received by retarder plate 463 and retarder plate 463 is further configured to receive image light 415 and to transmit image light 415 while converting the polarization of image light 415 to a second linear polarization orthogonal to the first linear polarization. In-coupler 450 is configured to receive image light 415 having the second linear polarization, transmitted through one or more lenses 430 and waveguide 440, and deflect at least a portion of image light 415, i.e., first portion 415-A of image light 414, such that first portion 415-A of image light 415 impinges on a surface of first waveguide 440 at an incident angle $\theta_1$ that is above a critical angle associated with first waveguide 440.

Figure 4D:
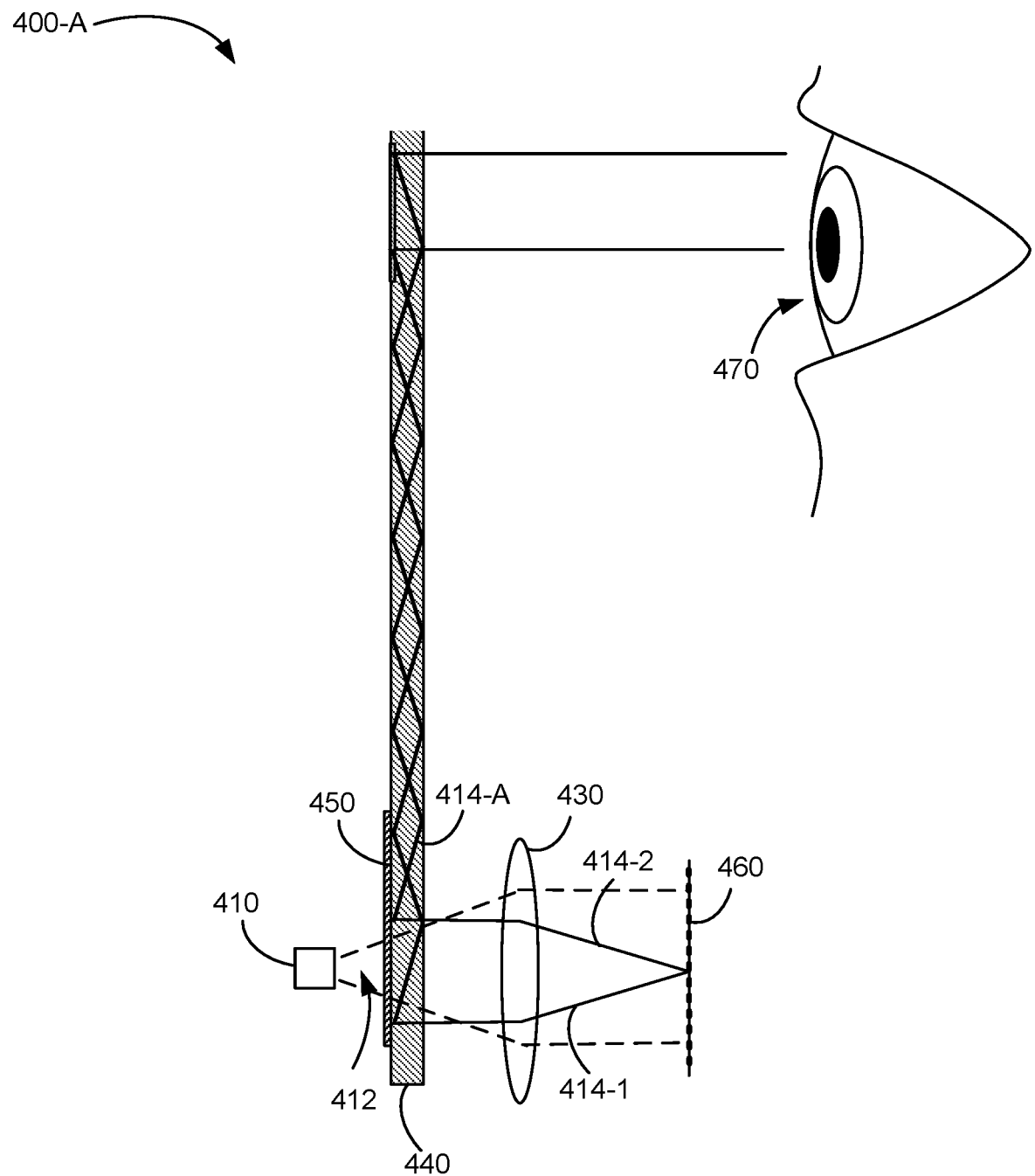
FIG. 4D is a schematic diagram illustrating the display device of FIG. 4A in accordance with some embodiments.

FIG. 4D is a schematic diagram illustrating display device 400-A in accordance with some embodiments. As shown, image light 414 includes rays 414-1 that diverge as they propagate from reflective display 460 to one or more lenses 430. As shown, image light 414 is transmitted through, and focused by, one or more lenses 430 such that the divergence of image light 414 is reduced. In some embodiments, image light 414 is collimated by one or more lenses 430, as shown. Also, illumination light 412 diverges as it propagates from projector 410 to one or more lenses 430. One or more lenses are configured to focus illumination light 412 such that the divergence of illumination light 412 is reduced.

Figure 4E:
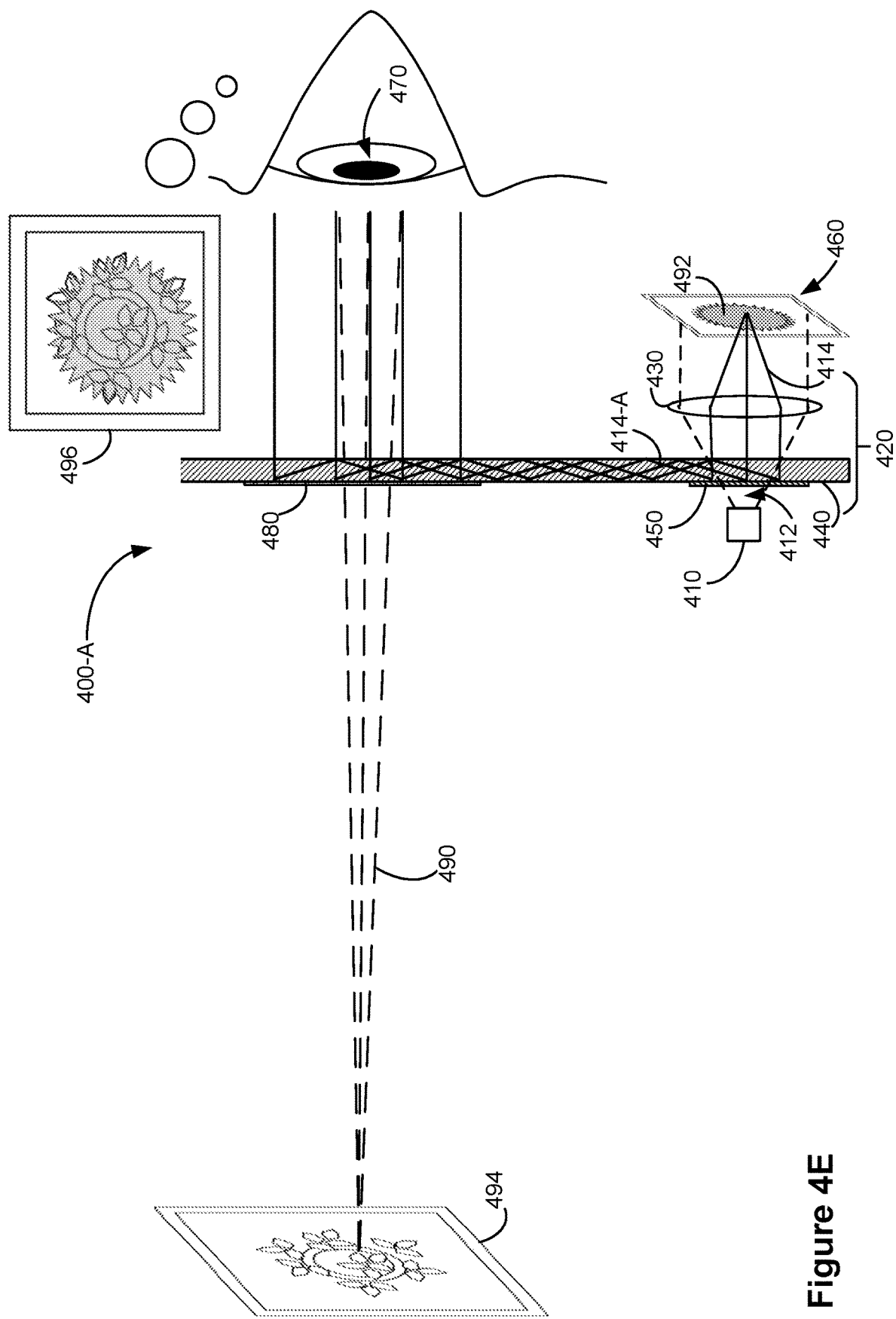
FIG. 4E is a schematic diagram illustrating the display device of FIG. 4A in an augmented reality application in accordance with some embodiments.

FIG. 4E is a schematic diagram illustrating display device 400-A of FIG. 4A in an augmented reality application, in accordance with some embodiments. As shown on FIG. 4E, image light 414 output by reflective display 460 corresponds to one or more images (e.g., image 492). As described above with respect to FIG. 4A, optical assembly 420 is configured to project image light 414 reflected by reflective display 460 toward eye 470 of the user of display device 400-A. First waveguide 440 is further configured as an optical combiner to transmit light from outside display device 400-A, e.g., light 490 from object 494 positioned outside display device 400-A. In FIG. 4E, object 494 is illustrated as a framed picture that the user of display device 400-A is looking at. Image light 414 output from first waveguide 440 is combined, or overlapped, with light 490 from object 494 to form combined image 496 in user's eye 470. As a result, the user's perception of object 494 is augmented by image 492 output by reflective display 460, as shown in FIG. 4E.

As shown in FIG. 4E, one or more output couplers 480 are configured to expand the etendue of image light 414 in optical assembly 420. An original input pupil area of light 412 is increased by replication due to multiple interactions with one or more output couplers 480.

Figure 4F:
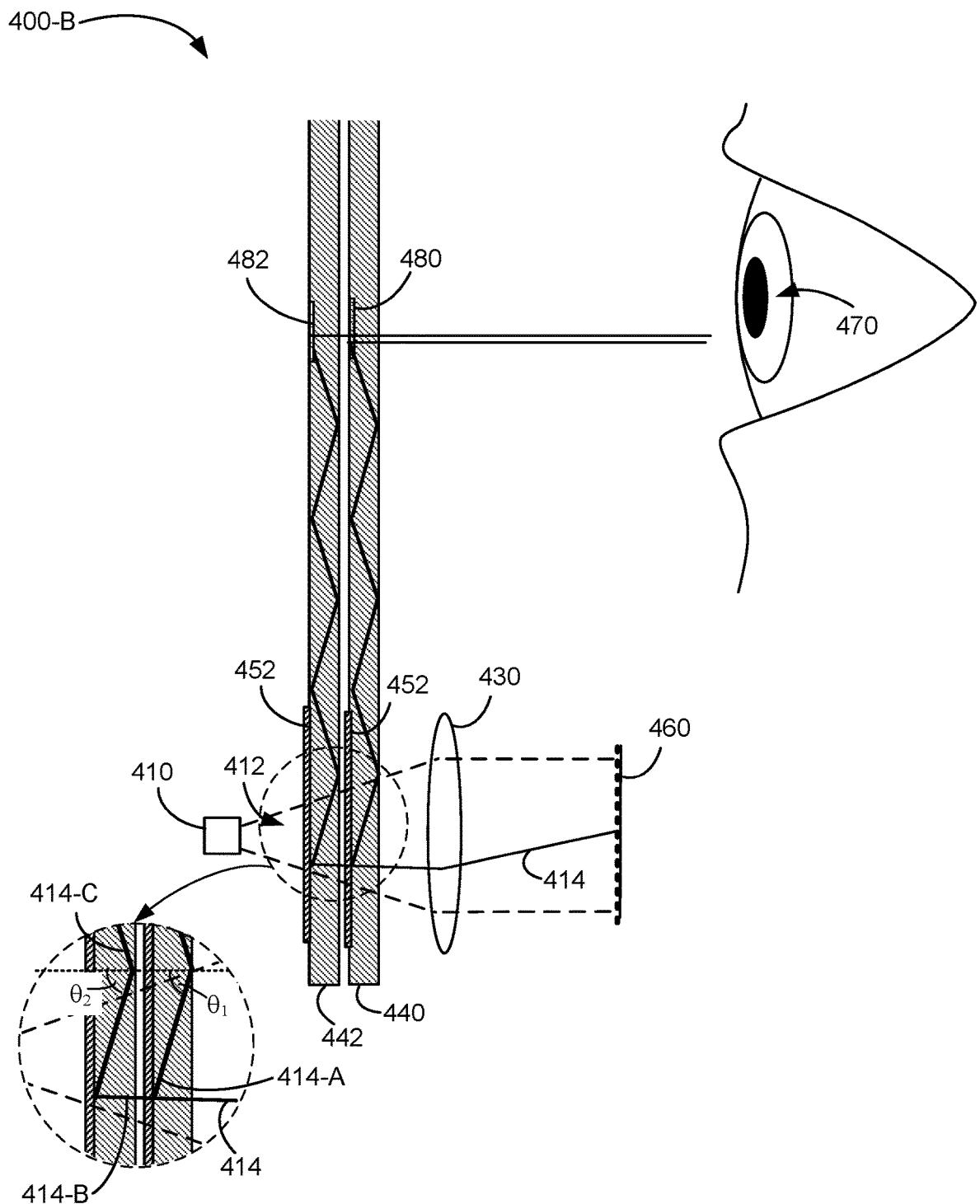
FIG. 4F is a schematic diagram illustrating a display device in accordance with some embodiments.

FIG. 4F is a schematic diagram illustrating display device 400-B in accordance with some embodiments. Display device 400-B corresponds to display device 400-A described above with respect to FIG. 4A, except that optical assembly 420 in display device 400-B further includes second waveguide 442 and second in-coupler 452 coupled with second waveguide 442. Second waveguide 442 is positioned parallel to first waveguide 440. In some embodiments, second in-coupler 452 is a PVG (e.g., polarization volume grating 700 described below with respect to FIGS. 7A-7D), and is selective with respect to polarization, incident angle, and/or wavelength range of light incident thereon. Second in-coupler 452 and at least a portion of second waveguide 442 are disposed between projector 410 and reflective optical element 460.

As shown in FIG. 4F, in addition to being polarization selective, first in-coupler 450 is also wavelength selective. In some embodiments, first portion 414-A of image light 414 redirected by first in-coupler 450 is in a first wavelength range. Thus, first in-coupler 450 is further configured to transmit a portion 414-B of image light 414 having a second wavelength range distinct from the first wavelength range while redirecting a first portion 414-A of image light 414. Second in-coupler 452 is configured to, similarly to first in-coupler 450, to receive and transmit illumination light 412 having the first circular polarization. Second in-coupler 452 is further configured to receive a portion 414-B of image light 414 having the second circular polarization and the second wavelength range, and to redirect at least a portion of portion 414-B, i.e., a second portion 414-C of image light 414, so that the second portion 414-C impinges on a surface of second waveguide 442 at an incident angle $\theta_2$ that is above a critical angle associated with second waveguide 442. Thus, the second portion 414-C would undergo total internal reflection inside second waveguide 442 and continue to propagate through the waveguide via a series of total reflection events. In some embodiments, the incident angle $\theta_2$ is distinct from the incident angle $\theta_1$.

In some embodiments, the first wavelength range and the second wavelength range correspond to distinct colors or ranges of colors. For example, the first wavelength range corresponds to red light (e.g., the first wavelength range is from 635 nm through 700 nm corresponding to red color) and the second wavelength range corresponds to green light (e.g., the first wavelength range is from 520 nm through 560 nm corresponding to green color). In some embodiments, the first wavelength range corresponds to a first portion of a first color and a first portion of a second color and the second wavelength range corresponds to a second portion of the first color and a second portion of the second color. For example, the first wavelength range corresponds to a first portion of red light and a first portion of green (e.g., the first wavelength range is from 635 nm through 650 nm and from 520 nm through 540 nm) and the second wavelength range corresponds to a second portion of red light and a second portion of green (e.g., the first wavelength range is from 650 nm through 700 nm and from 540 nm through 560 nm). In some embodiments, the wavelength ranges are a combination of three colors, such as red, green and blue (e.g., a blue color ranging from 450 nm through 490 nm).

Display device 400-B further includes one or more couplers 482 coupled with second optical waveguide 442. One or more output couplers 482 correspond to one or more output couplers 480 and are configured to redirect at least a portion of respective image light (e.g., second portion 414-C) toward eye 470.

Figure 4G:
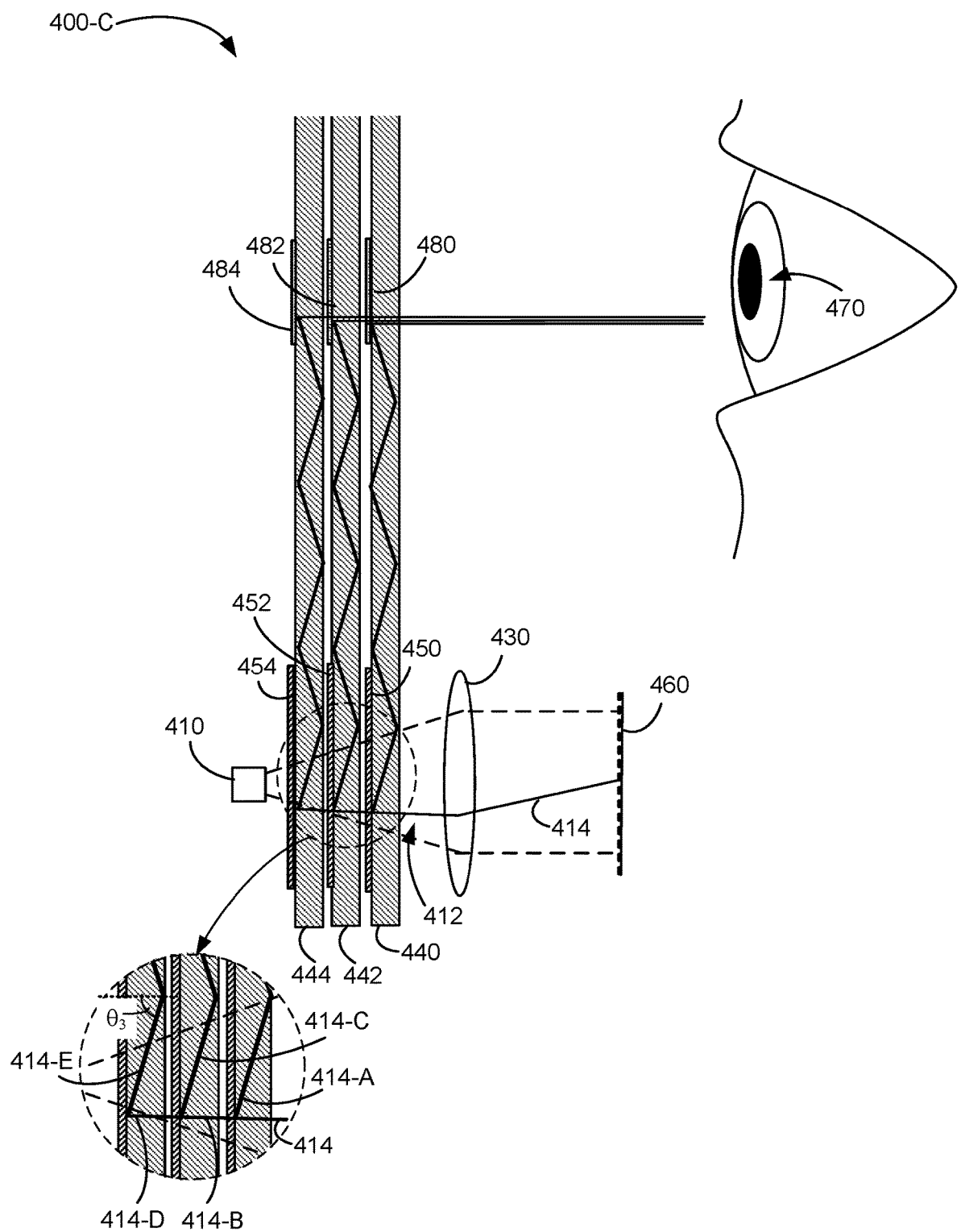
FIG. 4G is a schematic diagram illustrating a display device in accordance with some embodiments.

FIG. 4G is a schematic diagram illustrating display device 400-C in accordance with some embodiments. Display device 400-C corresponds to display device 400-B described above with respect to FIG. 4F, except that optical assembly 420 of display device 400-C includes third waveguide 444 and third in-coupler 454 coupled with third waveguide 444. Third waveguide 444 is positioned parallel to first waveguide 442 and second waveguide 442. In some embodiments, third in-coupler 454 is a PVG (e.g., polarization volume grating 700 described below with respect to FIGS. 7A-7D), and is selective with respect to polarization, incident angle, and/or wavelength range, of light incident thereon. Third in-coupler 454 and at least a portion of third waveguide 444 are disposed between projector 410 and reflective optical element 460.

As shown in FIG. 4G, in addition to being polarization selective, second in-coupler 452 is also wavelength selective. In some embodiments, the first portion 414-A of image light 414 redirected by first in-coupler 450 is in the first wavelength range and second portion 414-C of image light 414 redirected by second in-coupler 452 is in the second wavelength range. Thus, first in-coupler 450 and second in-coupler 452 are configured to transmit portion 414-D, which is a portion of the portion 414-B of image light 414, having a third wavelength range while respectively redirecting first portion 414-A and second portion 414-C of image light 414. Third in-coupler 454 is configured to, similar to first in-coupler 450 and second in-coupler 452, to receive and transmit illumination light 412 having the first circular polarization. Third in-coupler 454 is further configured to receive portion 414-D of image light 414 having the second circular polarization and the third wavelength range, and to redirect at least a portion of the third portion 414-D of image light 414, i.e. third portion 414-E of image light 414, so that third portion 414-D impinges on a surface of the third waveguide 444 at an incident angle $\theta_3$ that is above a critical angle associated with third waveguide 444. Thus, third portion 414-E would undergo total internal reflection inside third waveguide 444 and continue to propagate through the waveguide via a series of total reflection events. In some embodiments, the incident angle $\theta_3$ is distinct from the incident angle $\theta_1$ and/or the incident angle $\theta_2$, which may also be distinct from one another.

In some embodiments, the first wavelength range, the second wavelength range, and the third wavelength range correspond to distinct colors or ranges of colors. For example, the first wavelength range corresponds to red light, the second wavelength range corresponds to green light, and the third wavelength range corresponds to blue light. In some embodiments, the first wavelength range corresponds to a first portion of a first color, a first portion of a second color, and a first portion of a third color, the second wavelength range corresponds to a second portion of the first color, a second portion of the second color and a third portion of the third color. For example, the first wavelength range corresponds to a first portion of red light, a first portion of green and a first portion of blue (e.g., the first wavelength range is from 635 nm through 650 nm, from 520 nm through 540 nm and from 450 nm through 470 nm), the second wavelength range corresponds to a second portion of red light, a second portion of green light and a second portion of blue light (e.g., the first wavelength range is from 650 nm through 670 nm, from 540 nm through 550 nm, and from 470 nm through 480 nm), and the third wavelength range corresponds to a third portion of red light, a third portion of green light, and a third portion of blue light (e.g., the first wavelength range is from 670 nm through 700 nm, from 550 nm through 560 nm, and from 480 nm through 490 nm).

Display device 400-C further includes one or more couplers 484 coupled with third optical waveguide 442. One or more output couplers 484 correspond to one or more output couplers 480 and are configured to redirect at least a portion of respective image light (e.g., third portion 414-E) toward eye 470.

In some embodiments, a display device includes two or more displays. In some embodiments, such multi-display devices may provide an increased field of view having individual projectors providing image light for distinct portions of an eye of a user. In some embodiments, such multi-display devices may provide an increase field of view (e.g., a first display providing light to a smaller area of the field of view with higher resolution and a second display simultaneously providing light to a larger area of the field of view with a lower resolution). In some embodiments, the multi-display devices include multiple displays outputting light of different colors (e.g., a first display outputting mostly red colored light, a second display outputting mostly blue colored light and a third display outputting mostly green colored light).

Figure 4H:
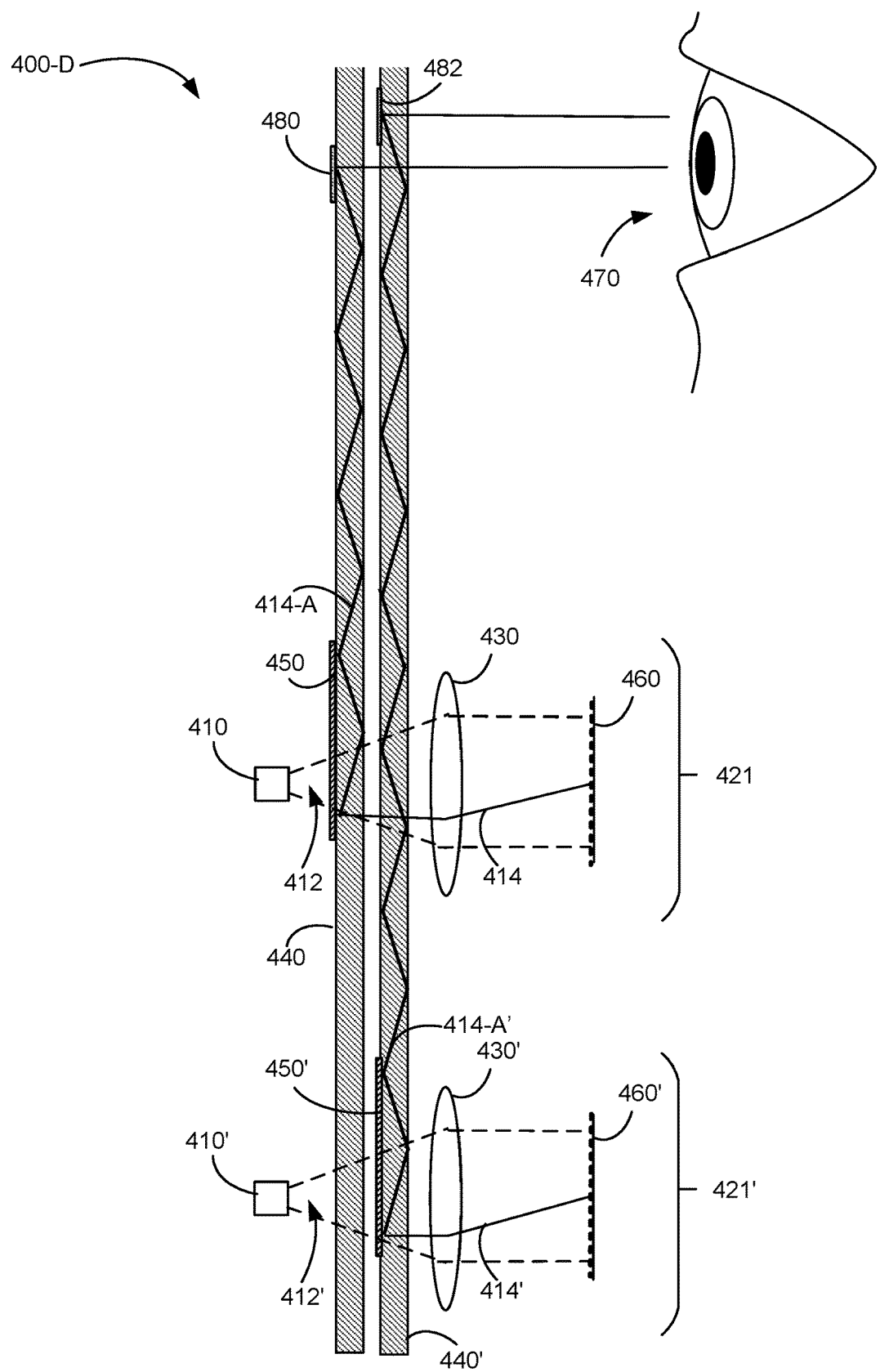
FIG. 4H is a schematic diagram illustrating a display device in accordance with some embodiments.

FIG. 4H is a schematic diagram illustrating display device 400-D in accordance with some embodiments. As shown in FIG. 4H, display device 400-D includes a plurality of display assemblies (e.g., display assemblies 421 and 421') corresponding to respective ones of a plurality of wavelength ranges (e.g., the first wavelength range and the second wavelength range) and a plurality of optical waveguides (e.g., waveguides 440 and 440') corresponding to respective ones of the plurality of display assemblies. In some embodiments, a respective display assembly of the plurality of display assemblies in display device 400-D includes a respective display configured to output illumination light in a respective wavelength range, a respective lens assembly (e.g., including one or more lenses) configured to focus the illumination light output from the respective display, a respective reflective display element having a respective reflective surface configured to output image light, and a respective in-coupler configured to redirect the image light in the respective wavelength range so that the image light in the respective wavelength range propagates through a portion of the respective optical waveguide by total internal reflection.

For example, display assembly 421 includes projector 410 configured to output image light 412 in the first wavelength range, one or more lenses 430 configured to focus image light 412 output from projector 410, reflective display 460 configured to receive illumination light 412 and output image light 414, and in-coupler 450 configured to redirect at least a portion of image light 414, i.e., portion 414-A of image light 414 output by reflective display 460 so that portion 414-A of image light 414 in the first wavelength range propagates through a portion of optical waveguide 440 by total internal reflection. Likewise, display assembly 421' includes projector 410' configured to output image light 412' in the second wavelength range, one or more lenses 430' configured to focus image light 412' output from projector 410', reflective display 460' configured to receive illumination light 412' and output image light 414', and in-coupler 550' configured to redirect at least a portion of image light 414', i.e., portion 414-A' of image light 414 output by reflective display 460' so that image light 414' in the second wavelength range propagates through a portion of optical waveguide 440' by total internal reflection.

In some embodiments, a display device includes two display assemblies (e.g., display assemblies 421 and 421') and a single optical waveguide (e.g., optical waveguide 440) and the two display assemblies are configured to in-couple image light through the single optical waveguide. In some embodiments, a display device includes three display assemblies and one or two optical waveguides.

Figure 5:
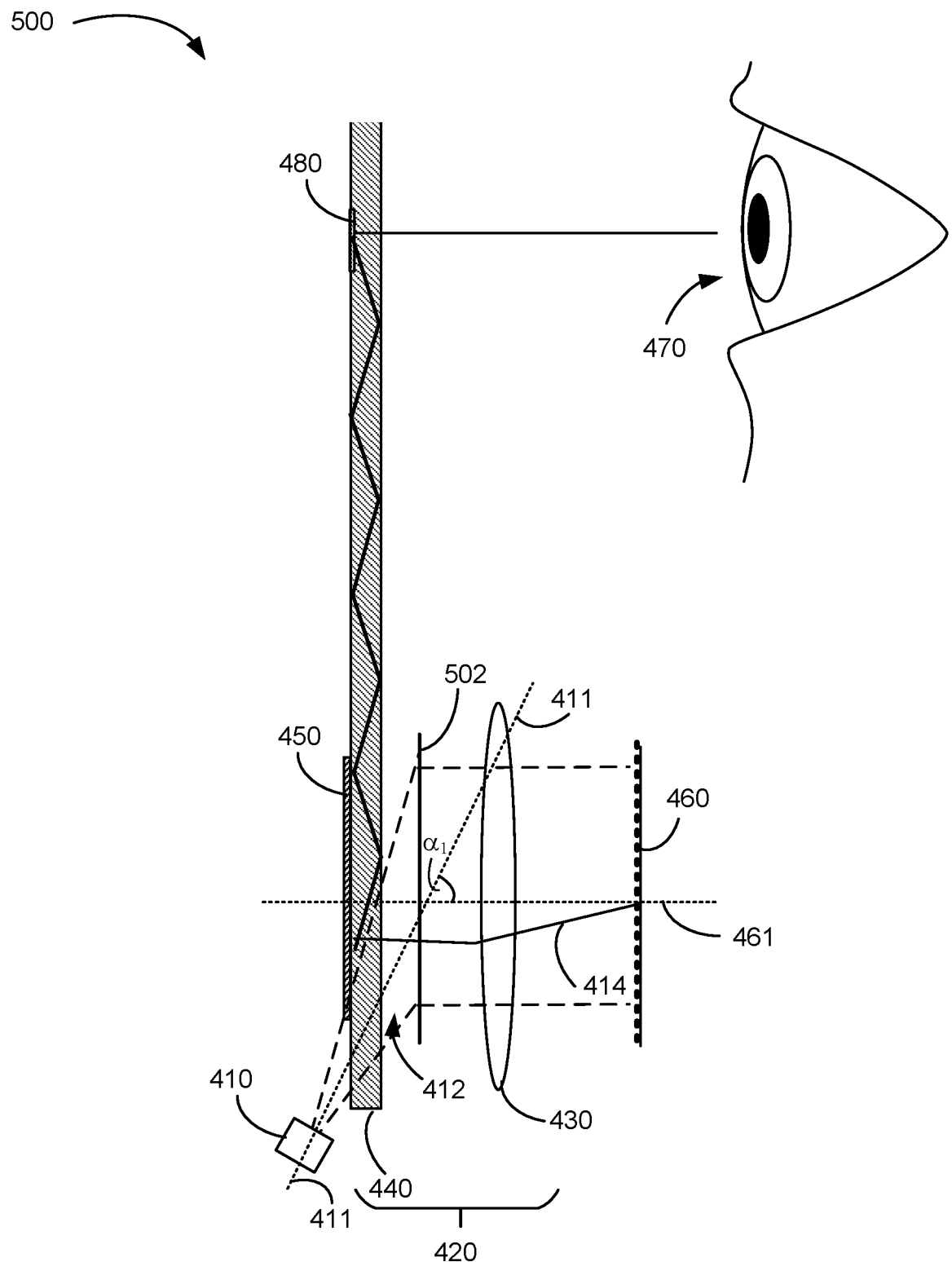
FIG. 5 is a schematic diagram illustrating a display device in accordance with some embodiments.

FIG. 5 is a schematic diagram illustrating display device 500 in accordance with some embodiments. Display device 500 corresponds to display device 400-A described above with respect to FIG. 4A, except that projector 410 is disposed off-axis from reflective display 460 and optical assembly 420 in display device 500 further includes transmissive optical element 502 disposed between first waveguide 440 and reflective display 460. In some embodiments, transmissive optical element 502 is a PVG (e.g., polarization volume grating 700 described below with respect to FIGS. 7A-7D), and is selective with respect to polarization, incident angle, and/or wavelength range of light incident thereon. In some embodiments, transmissive optical element 502 is a PVH that diffracts or redirects light having the first circular polarization and a first incident angle range and transmits light having the first circular polarization and a second incident angle range distinct from the first incident angle range.

As shown, reflective display 460 has first optical axis 461 and projector 410 has second optical axis 411 that is non-parallel to first optical axis 461 of reflective display 460. First optical axis 461 and second optical axis 411 form angle cu with respect to each other. As shown, projector 410 is configured to project illumination light 412 having the first circular polarization toward transmissive optical element 502 so that illumination light 412 impinges on transmissive optical element 502 with incident angles in the first incident angle range. Transmissive optical element 502 is configured to redirect illumination light 412 toward reflective display 460 while converting its polarization from the first circular polarization to the second circular polarization. In some embodiments, transmissive optical element 502 focuses illumination light 412 such that illumination light 412 transmitted by transmissive optical element 502 is more collimated that the illumination light incident on transmissive optical element 502. In some embodiments, transmissive optical element 502 collimates illumination light 412 and redirects illumination light 412 such that illumination light 412 is incident on reflective display 460 at an angle substantially parallel to first optical axis 461, thereby providing more uniform illumination to reflective display 460. Transmissive optical element 502 is further configured to receive image light 414 having the first circular polarization from reflective display 460 with incident angles in the second incident angle range and transmit the received light without changing its direction or polarization.

Figure 6:
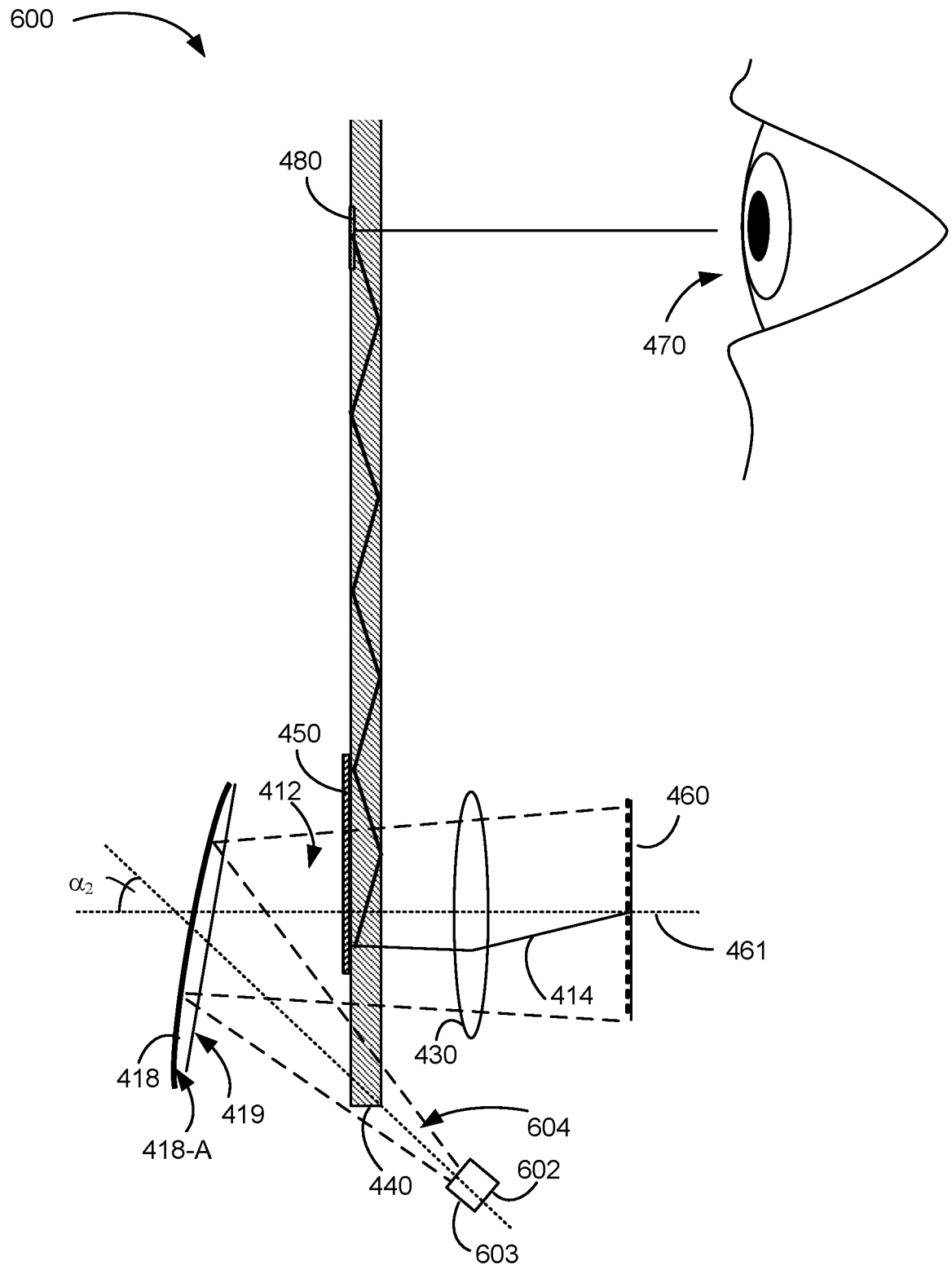
FIG. 6 is a schematic diagram illustrating a display device in accordance with some embodiments.

FIG. 6 is a schematic diagram illustrating a display device in accordance with some embodiments. Display device 600 corresponds to display device 500 described above with respect to FIG. 5, except that display device 600 further includes light source 602 and reflector 418. Light source 602 is disposed on second side 440-B of first waveguide 440. Light source 602 is configured to output source light 604, which is at least partially transmitted through first waveguide 440 as it propagates toward reflector 418. Reflector 418 corresponds to projector 410 in FIG. 4A, except that reflector 418 is configured to receive source light 604 and reflect source light 604 toward first side 440-A of first waveguide 440 as illumination light 412. In some embodiments, reflector 418 includes curved reflective surface 418-A configured to focus source light 604 from light source 602 such that illumination light 412 is more collimated than source light 604. In some embodiments, curved reflective surface 418-A is configured reflect collimated illumination light 412.

In some embodiments, source light 604 has the second circular polarization and illumination light 412 has the first circular polarization, as the polarization is changed when the light is reflected of reflector 418.

In some embodiments, source light 604 has the first circular polarization and reflector 418 further includes retarder plate 419 (e.g., a quarter-wave plate) optically coupled with reflective surface 418-A of reflector 418. Retarder plate 419 is configured to receive source light 604 having the first circular polarization from light source 602, convert the polarization of the light to a linear polarization while transmitting source light 604 to curved reflective surface 418-A. Retarder plate 419 is further configured to receive illumination light 412 having the linear polarization reflected off of curved reflective surface 418-A and convert the polarization of the light back to the first circular polarization while transmitting illumination light 412 toward first waveguide 440. In such embodiments, source light 604 may partially transmit through first in-coupler 450 without being redirected by first in-coupler 450 to propagate through first waveguide 440.

FIGS. 7A-7D are schematic diagrams illustrating a polarization volume grating (PVG) 700 in accordance with some embodiments. In some embodiments, PVG corresponds to in-couplers described above with respect to FIGS. 4A, 4F, and 4G (e.g., first in-coupler 450, second in-coupler 452, and third in-coupler 454). In some embodiments, PVG 700 is a liquid crystal PVG including a layer of liquid crystals arranged in helical structures (e.g., a liquid crystal formed of a cholesteric liquid crystal). A PVG adds or removes optical power based in part on polarization of an incident light. The PVG is selective with respect to circular polarization of light. When state (handedness) of the circularly polarized light is along a helical axis of a liquid crystal, the PVG interacts with the circularly polarized light and thereby changes the direction of the light (e.g., reflects, refracts or diffracts the light). Concurrently, while changing the direction of the light, the PVG also changes the polarization of the light. In contrast, the PVG transmits light with opposite circular polarization without changing its direction or polarization. For example, a PVG changes polarization of RCP light to LCP light and simultaneously redirects the light while transmitting LCP light without changing its polarization or direction. In some embodiments, a PVG is also selective on wavelength a range and/or on an incident angle. If the incident light is at the designed wavelength, RCP light is redirected and converted to LCP light while RCP light with a wavelength outside the designed wavelength range is transmitted without its polarization converted. If the incident light has an incident angle at the designed incident angle range, RCP light is converted to LCP light and redirected while RCP light with an incident angle outside the designed incident angle range is transmitted without its polarization being converted.

Figure 7C:
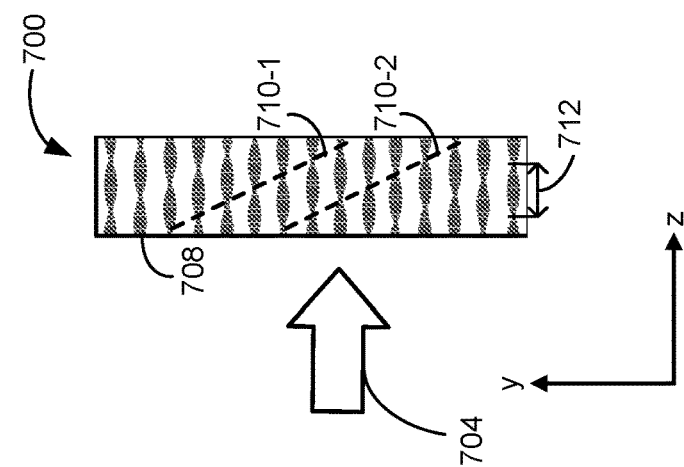
FIGS. 7A-7D are schematic diagrams illustrating a polarization volume grating in accordance with some embodiments.
Figure 7B:
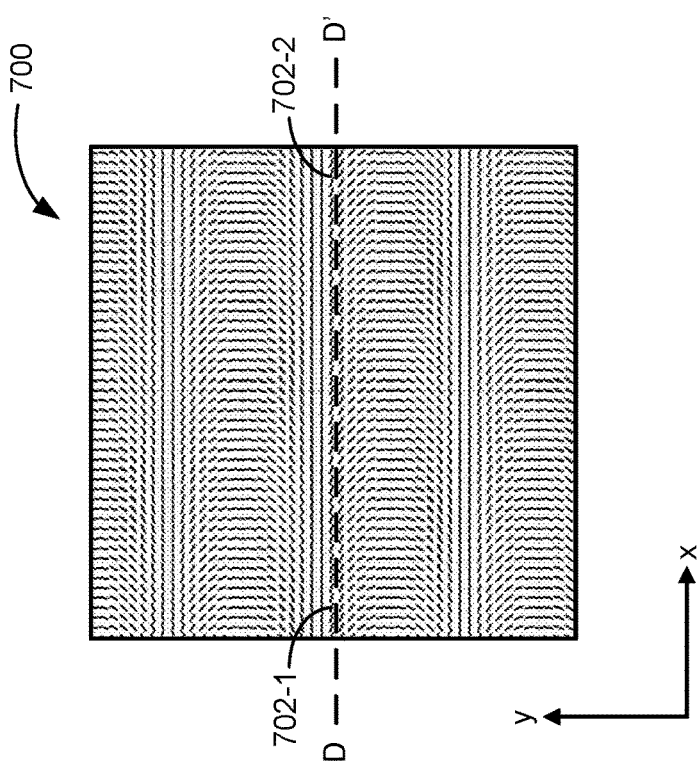
Figure 7A:
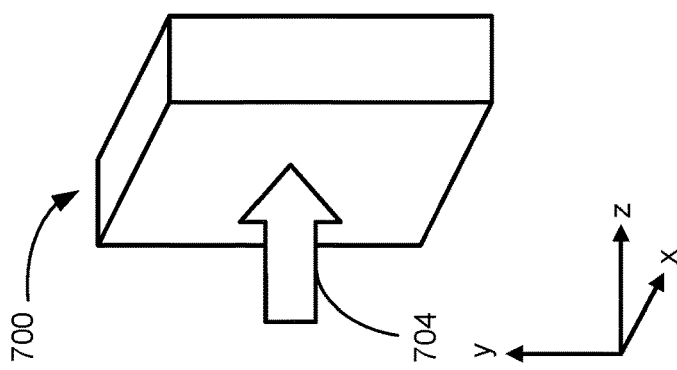
Figure 7D:
Figure 7D:
Figure 7D:
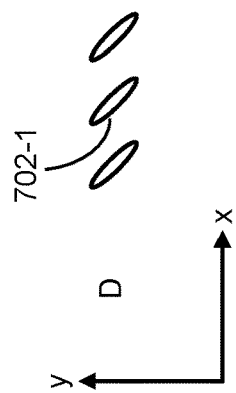

FIG. 7A illustrates a three dimensional view of PVG 700 with incoming light 704 entering the grating along the z-axis. FIG. 7B illustrates an x-y-plane view of PVG 700 with a plurality of liquid crystals (e.g., liquid crystals 702-1 and 702-2) with various orientations. The orientations of the liquid crystals are constant along reference line between D and D' along the x-axis, as shown in FIG. 7D illustrating a detailed plane view of the liquid crystals along the reference line. As shown in FIG. 7C, a pitch defined as a distance along the y-axis at which an azimuth angle of a liquid crystal has rotated 180 degrees is constant throughout the grating. FIG. 7C illustrates a y-z-cross-sectional view of PVG 700. PVG 700 has helical structures 708 with helical axes aligned corresponding to the y-axis. The helical structures create a volume grating with a plurality of diffraction planes (e.g., planes 710-1 and 710-2). Diffraction planes of PVG 700 extend across the grating. In FIG. 7C, diffraction planes 710-1 and 710-2 are tilted with respect to the z-axis. Helical structures 708 define the polarization selectivity of PVG 700, as light with circular polarization handedness corresponding to the helical axes is diffracted while light with circular polarization with the opposite handedness is not diffracted. Helical structures 708 also define the wavelength selectivity of PVG 700, as light with a wavelength close to a helical pitch (e.g., helical pitch 712 in FIG. 7C) is diffracted while light with other wavelengths is not diffracted.

In light of these principles, we now turn to certain embodiments of the present disclosure.

In accordance with some embodiments, an optical device includes a first waveguide, a projector, a reflective display, and a first in-coupler (e.g., first waveguide 440, projector 410, reflective display 460, and first in-coupler 450 in FIG. 4A). The first waveguide has a first side and an opposing second side (e.g., first waveguide 440 has first side 440-A and second side 440-B). The projector is configured to project illumination light (e.g., illumination light 412) toward the first side of the first waveguide. The reflective display is configured to receive the illumination light and to output image light (e.g., image light 414) toward the second side of the first waveguide. The first in-coupler is configured to receive the image light output by the reflective display and redirect a first portion of the image light (e.g., first portion 414-A of image light 414) so that the first portion of the image light undergoes total internal reflection inside the first waveguide.

In some embodiments, the first in-coupler is selected from the group consisting of: a liquid crystal based polarization selective element, a polarization selective element including a metasurface, a polarization selective element including a resonant structured surface, a polarization selective element including a continuous chiral layer, and a polarization selective element including a birefringent material.

In some embodiments, the liquid crystal based polarization selective element is a polarization volume grating (e.g., PVG 700 in FIGS. 7A-7D).

In some embodiments, the first in-coupler is a transmission grating disposed adjacent to the second side of the first waveguide (e.g., transmission PVG 450-A in Diagram (I) of FIG. 4B). The transmission grating is configured to redirect the first portion of the image light such that the first portion of the image light is transmitted toward the first side of the first waveguide at an incident angle that is greater than a critical angle associated with the first waveguide (e.g., first portion 414-A of image light 414 impinges on internal surface 443-A at the angle $\theta_1$). The critical angle is the angle of incidence above which total internal reflection occurs. In some embodiments, the first in-coupler is disposed on a first surface (e.g., surface 441-A) of the first waveguide so that at least the first portion of the image light impinges on the first waveguide subsequent to impinging on the first in-coupler.

In some embodiments, the first in-coupler is a reflective polarization volume grating disposed adjacent to the first side of the first waveguide (e.g., reflective PVG 450-B in Diagram (II) of FIG. 4B). The reflective polarization volume grating is configured to redirect the first portion of the image light such that the first portion of the image light is deflected toward the second side of the first waveguide at an incident angle that is greater than a critical angle associated with the first waveguide (e.g., first portion 414-A of image light 414 impinges on internal surface 443-B at the angle $\theta_2$). In this embodiments, the first in-coupler is disposed on a second surface (e.g., 441-B) of the first waveguide so that at least the first portion of the image light impinges on the first waveguide prior to impinging on the first in-coupler. In some embodiments, at least the first portion of the image light impinges of the reflective grating inside the first waveguide.

In some embodiments, the optical device further includes one or more lenses (e.g., one or more lenses 430 in FIG. 4A) disposed between the first in-coupler and the reflective display. The one or more lenses is configured to focus the image light from the reflective display (e.g., image light 414).

In some embodiments, the reflective display includes a reflective surface and a plurality of pixels (e.g., reflective surface 460 includes reflective surface 464 and pixels 462-1 and 462-2 in inset (II) of FIG. 4A). A respective pixel in the plurality of pixels has respective modulating elements. The respective modulating elements are configured to modulate an amount of the illumination light (e.g., illumination light 412) that reaches the reflective surface so that the image light (e.g., image light 414) corresponds to one or more images to be displayed by the optical device.

In some embodiments, the reflective display is a spatial light modulator. In some embodiments, the reflective display is a Liquid Crystal on Silicon (LCOS) display.

In some embodiments, the first in-coupler is configured to transmit a second portion of the image light (e.g., portion 414-B in inset (I) of FIG. 4F). The first portion of the image light has a first wavelength range and the second portion of the image light has a second wavelength range distinct from the first wavelength range.

In some embodiments, the optical device further includes a second waveguide disposed between the projector and the first waveguide and a second in-coupler (e.g., second waveguide 442 in FIG. 4F). The second in-coupler is configured to receive the second portion of the image light transmitted by the first in-coupler and redirect a third portion of the image light (e.g., second portion 414-C of image light 414) so that the third portion of the image light undergoes total internal reflection inside the second waveguide. The third portion of the image light includes at least a portion of the second portion of the image light.

In some embodiments, the projector is configured to project the illumination light toward the reflective display through the first in-coupler (e.g., FIG. 4A).

In some embodiments, the first in-coupler is further configured to transmit the illumination light projected by the projector toward the reflective display without changing its polarization or direction (e.g., FIG. 4A).

In some embodiments, the reflective display has a first optical axis and the projector has a second optical axis that forms an angle with the first optical axis (e.g., reflective display 460 has first optical axis 461 and projector 410 has second optical axis 411 in FIG. 5).

In some embodiments, the optical device further includes a transmissive optical element (e.g., transmissive optical element 502 in FIG. 5) disposed between the first waveguide and the reflective display. The projector (e.g., projector 410) is configured to project the illumination light (e.g., illumination light 412) having a first polarization (e.g., a first circular polarization) toward the transmissive optical element such that the illumination light impinges on the transmissive optical element with incident angles in a first incident angle range. The transmissive optical element is configured to redirect the illumination light toward the reflective display (e.g., reflective display 460) while converting its polarization from the first polarization to a second polarization (e.g., a second circular polarization) distinct from the first polarization. The transmissive optical element is further configured to receive, from the reflective display, the image light (e.g., image light 414) with incident angles in a second incident angle range distinct from the first incident angle range. The image light has the first polarization. The transmissive optical element is also configured to transmit the image light received from the reflective display without changing its direction or polarization.

In some embodiments, the optical device further includes a light source (e.g., light source 602 in FIG. 6) disposed on the second side of the first waveguide and configured to output source light (e.g., source light 604). The projector (e.g., reflector 418 including reflector 418) is configured to reflect the source light toward the first side of the first waveguide as the illumination light (e.g., image light 412).

In some embodiments, the reflective display has a first optical axis (e.g., first optical axis 461) and the light source has a second optical axis (e.g., second optical axis 603) that forms an angle with the first optical axis.

In some embodiments, the projector includes a reflector having a curved reflective surface (e.g., curved reflective surface 418-A) configured to focus the source light from the light source such that the illumination light is more collimated than the source light output from the light source.

In accordance with some embodiments, a head-mounted display device (e.g., display device 400-A in FIG. 4A) includes a first waveguide, a projector, a reflective display, and a first in-coupler. The first waveguide has a first side and an opposing second side. The projector is configured to project illumination light toward the first side of the first waveguide. The reflective display is configured to receive the illumination light and to output image light toward the second side of the first waveguide. The first in-coupler and one or more output couplers are positioned at a distance from the first in-coupler. The first in-coupler is configured to receive the image light output by the reflective display and redirect a first portion of the image light so that the first portion of the image light propagates toward the one or more output couplers (e.g., one or more output couplers 480) by total internal reflection inside the first waveguide. The one or more output couplers is configured to receive and redirect the first portion of the image light out of the first waveguide.

In some embodiments, the image light output by the display corresponds to one or more images (e.g., image 492 in FIG. 4E). The first waveguide is further configured to transmit light (e.g., light 490) from one or more objects (e.g., object 494) outside the display device such that the one or more images are perceived by the user of the head-mounted display device together with the one or more objects (e.g., as combined image 496).

In some embodiments, the first in-coupler is configured to transmit a second portion of the image light (e.g., FIG. 4F). The first portion of the image light has a first wavelength range and the second portion of the image light has a second wavelength range distinct from the first wavelength range. The head-mounted display device further includes a second waveguide disposed between the projector and the first waveguide and a second in-coupler. The second in-coupler is configured to receive the second portion of the image light transmitted by the first in-coupler and redirect a third portion of the image light so that the third portion of the image light undergoes total internal reflection inside the second waveguide. The third portion of the image light includes at least a portion of the second portion of the image light.

In accordance with some embodiments, a method (e.g., FIG. 4A) includes projecting illumination light toward a first side of a first waveguide and receiving the illumination light at a reflective display facing a second side of the first waveguide. In response to receiving the illumination light, the method includes outputting image light from the reflective display toward a second side of the first waveguide. The method also includes receiving, by a first in-coupler, the image light output by the reflective display and redirecting, by the first in-coupler, at least a first portion of the image light so that the at least first portion of the image light undergoes total internal reflection inside the first waveguide.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical device, comprising:
   a first waveguide having a first side and an opposing second side;
   a projector positioned to project illumination light toward the first side of the first waveguide;
   a reflective display positioned to receive the illumination light and to output image light toward the second side of the first waveguide; and
   a first in-coupler positioned to:
      receive the image light output by the reflective display; and
      redirect a first portion of the image light so that the first portion of the image light undergoes total internal reflection inside the first waveguide, wherein:
      the projector is positioned to project the illumination light toward the reflective display at least partially through the first in-coupler;
      the reflective display has a first optical axis perpendicular to the first waveguide;
      the projector has a second optical axis non-perpendicular to the first waveguide so that the illumination light impinges on the first waveguide at an oblique angle, the second optical axis forming an angle with the first optical axis; and
      the first in-coupler is an incident angle-selective optical element configured to transmit the illumination light impinging on the first in-coupler at a first incident angle range while redirecting the first portion of the image light impinging on the first in-coupler at a second incident angle range distinct from the first incident angle range.

2. The optical device of claim 1, wherein the first in-coupler is selected from the group consisting of: a liquid crystal based polarization selective element, a polarization selective element including a metasurface, a polarization selective element including a resonant structured surface, a polarization selective element including a continuous chiral layer, and a polarization selective element including a birefringent material.

3. The optical device of claim 2, wherein the liquid crystal based polarization selective element is a polarization volume grating.

4. The optical device of claim 2, wherein the first in-coupler is a transmission grating disposed adjacent the second side of the first waveguide and is configured to redirect the first portion of the image light such that the first portion of the image light is transmitted toward the first side of the first waveguide at an incident angle that is greater than a critical angle associated with the first waveguide.

5. The optical device of claim 2, wherein the first in-coupler is a reflective polarization volume grating disposed adjacent the first side of the first waveguide and is configured to redirect the first portion of the image light such that the first portion of the image light is deflected toward the second side of the first waveguide at an incident angle that is greater than a critical angle associated with the first waveguide.

6. The optical device of claim 1, further comprising one or more lenses disposed between the first in-coupler and the reflective display, wherein the one or more lenses is configured to focus the image light from the reflective display.

7. The optical device of claim 1, wherein:
   the reflective display is a spatial light modulator including a reflective surface and a plurality of pixels, a respective pixel in the plurality of pixels having respective modulating elements; and
   the respective modulating elements are configured to modulate an amount of the illumination light that reaches the reflective surface so that the image light corresponds to one or more images to be displayed by the optical device.

8. The optical device of claim 1, wherein:
   the first in-coupler is configured to transmit a second portion of the image light, and
   the first portion of the image light has a first wavelength range and the second portion of the image light has a second wavelength range distinct from the first wavelength range.

9. The optical device of claim 8, further including:
   a second waveguide disposed between the projector and the first waveguide; and a second in-coupler configured to:
receive the second portion of the image light transmitted by the first in-coupler; and
redirect a third portion of the image light so that the third portion of the image light undergoes total internal reflection inside the second waveguide, the third portion of the image light including at least a portion of the second portion of the image light.

10. The optical device of claim 1, wherein the first in-coupler is further positioned to transmit the illumination light projected by the projector toward the reflective display while retaining its polarization.

11. The optical device of claim 1, wherein:
the projector includes a light source disposed on the second side of the first waveguide and configured to output source light, and
the optical device further includes a reflector configured to reflect the source light toward the first side of the first waveguide as the illumination light.

12. The optical device of claim 11, wherein the light source has a third optical axis that forms an angle with the first optical axis of the reflective display.

13. The optical device of claim 11, wherein the reflector has a curved reflective surface configured to focus the source light from the light source such that the illumination light is more collimated than the source light output from the light source.

14. A head-mounted display device, comprising:
the optical device of claim 1; and
one or more output couplers positioned at a distance from the first in-coupler, wherein
the one or more output couplers are positioned to receive and redirect the first portion of the image light out of the first waveguide.

15. The head-mounted display device of claim 14, wherein:
the image light output by the reflective display corresponds to one or more images; and
the first waveguide is further configured to transmit light from one or more objects outside the head-mounted display device such that the one or more images are perceived by a user of the head-mounted display device together with the one or more objects.

16. The head-mounted display device of claim 15, wherein:
the first in-coupler is configured to transmit a second portion of the image light, and
the first portion of the image light has a first wavelength range and the second portion of the image light has a second wavelength range distinct from the first wavelength range;
the head-mounted display device further comprising:
a second waveguide disposed between the projector and the first waveguide; and
a second in-coupler configured to:
receive the second portion of the image light transmitted by the first in-coupler; and
redirect a third portion of the image light so that the third portion of the image light undergoes total internal reflection inside the second waveguide, the third portion of the image light including at least a portion of the second portion of the image light.

17. The optical device of claim 1, wherein the projector includes a light source configured to output the illumination light in a first range of directions corresponding to a first divergence and the first waveguide is positioned to receive the illumination light in the first range of directions corresponding to the first divergence.

18. An optical device, comprising:
a first waveguide having a first side and an opposing second side;
a projector positioned to project illumination light toward the first side of the first waveguide;
a reflective display positioned to receive the illumination light and to output image light toward the second side of the first waveguide;
a first in-coupler positioned to:
receive the image light output by the reflective display; and
redirect a first portion of the image light so that the first portion of the image light undergoes total internal reflection inside the first waveguide, wherein:
the projector is positioned to project the illumination light toward the reflective display at least partially through the first in-coupler;
the first in-coupler is further positioned to transmit the illumination light projected by the projector toward the reflective display while retaining its polarization; and
the reflective display has a first optical axis and the projector has a second optical axis that forms an angle with the first optical axis; and
a transmissive optical element disposed between the first waveguide and the reflective display, wherein the projector is configured to project the illumination light having a first polarization toward the transmissive optical element such that the illumination light impinges on the transmissive optical element with incident angles in a first incident angle range, and wherein the transmissive optical element is configured to:
redirect the illumination light toward the reflective display while converting its polarization from the first polarization to a second polarization distinct from the first polarization,
receive, from the reflective display, the image light with incident angles in a second incident angle range distinct from the first incident angle range, the image light having the first polarization, and
transmit the image light received from the reflective display while retaining its polarization.

19. A method comprising:
projecting, by a projector, illumination light toward a first side of a first waveguide;
receiving the illumination light at a reflective display facing a second side of the first waveguide, wherein:
the illumination light received by the reflective display is at least partially projected through a first in-coupler;
the reflective display has a first optical axis perpendicular to the first waveguide; and
the projector has a second optical axis non-perpendicular to the first waveguide so that the illumination light impinges on the first waveguide at an oblique angle, the second optical axis forming an angle with the first optical axis;
in response to receiving the illumination light, outputting image light from the reflective display toward a second side of the first waveguide;
receiving, by the first in-coupler, the image light output by the reflective display;

redirecting, by the first in-coupler, at least a first portion of the image light so that the at least a first portion of the image light undergoes total internal reflection inside the first waveguide; and transmitting, with the first in-coupler that is an incident angle-selective optical element, the illumination light impinging on the first in-coupler at a first incident angle range while redirecting the first portion of the image light impinging on the first in-coupler at a second incident angle range distinct from the first incident angle range.

\* \* \* \* \*